United States Patent
Kamijima

(10) Patent No.: US 7,419,271 B2
(45) Date of Patent: Sep. 2, 2008

(54) MANUFACTURING METHOD FOR FINE STRUCTURE ELEMENT, FINE STRUCTURE ELEMENT MANUFACTURED BY THE METHOD, SPATIAL LIGHT MODULATOR, AND PROJECTOR

(75) Inventor: Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 427 days.

(21) Appl. No.: 11/067,916

(22) Filed: Mar. 1, 2005

(65) Prior Publication Data

US 2005/0225693 A1 Oct. 13, 2005

(30) Foreign Application Priority Data

| Mar. 4, 2004 | (JP) | ............................. 2004-060639 |
| Sep. 7, 2004 | (JP) | ............................. 2004-259313 |

(51) Int. Cl.
*G03B 21/14* (2006.01)
*B26D 3/00* (2006.01)

(52) U.S. Cl. ............................. 353/121; 83/39; 700/109

(58) Field of Classification Search ................ 264/2.7; 216/24, 26; 700/109, 160; 83/39–50; 438/691, 438/974; 353/121
See application file for complete search history.

(56) References Cited

U.S. PATENT DOCUMENTS 5,506,786 A * 4/1996 Itoh et al. .................. 700/175
6,107,771 A * 8/2000 Maeda ........................ 318/630
7,113,341 B2 * 9/2006 Kamijima ................... 359/619
7,242,444 B2 * 7/2007 Kamijima et al. ............. 349/56
2005/0018307 A1 * 1/2005 Kamijima ................... 359/628
2005/0141844 A1 * 6/2005 Olczak ....................... 385/146

FOREIGN PATENT DOCUMENTS

| CN | 1419140 A | 5/2003 |
| EP | 1 058 857 B1 | 12/2000 |
| JP | A 02-064690 | 3/1990 |
| JP | A 03-249602 | 11/1991 |
| JP | A 04-191822 | 7/1992 |
| JP | A 06-130356 | 5/1994 |
| JP | A 08-122709 | 5/1996 |
| JP | A 2001-255660 | 9/2001 |
| JP | A 2001-296649 | 10/2001 |
| JP | A-2003-149422 | 5/2003 |
| JP | 2005-037623 | 2/2005 |

* cited by examiner

*Primary Examiner*—William C. Dowling
(74) *Attorney, Agent, or Firm*—Oliff & Berridge, PLC

(57) ABSTRACT

Aspects of the invention can provide a manufacturing method for fine structure elements having a first flat portion forming step of forming an upper flat surface serving as a first flat portion on a substrate with a flat cutting tool serving as a cutting section a second flat portion forming step of cutting the upper flat surface serving as the first flat portion by a predetermined depth and forming a lower flat portion serving as a second flat portion with the flat cutting tool serving as the cutting section, a refractive surface forming step of forming a slope serving as a refractive surface having a predetermined angle with respect to the lower flat surface serving as the second flat portion by the flat cutting tool serving as the cutting section.

3 Claims, 17 Drawing Sheets

STEP d

STEP e

STEP f

MANUFACTURING METHOD FOR FINE STRUCTURE ELEMENT, FINE STRUCTURE ELEMENT MANUFACTURED BY THE METHOD, SPATIAL LIGHT MODULATOR, AND PROJECTOR

BACKGROUND

Aspects of the invention can relate to a manufacturing method for a fine structure element, a fine structure element manufactured by the method, a spatial light modulator, and a projector. In particular, the invention can relate to a fine structure element, such as a micro-prism.

Related art dot matrix image display devices, such as a liquid crystal panel (a liquid crystal display device), a CRT display device, and a plasma display device are often used as image display devices. The dot matrix image display devices represent images with a large number of pixels periodically arranged two-dimensionally. In this case, so-called sampling noise is caused by this periodical arrangement structure and an image quality is deteriorated (an image looks rough). To cope with the problem, a method of reducing the deterioration in an image quality has been proposed. See, for example, JP-A-8-122709.

In the related art dot matrix image display devices, a light shielding section called a black matrix is provided in regions among the pixels in order to reduce unnecessary light. In recent years, a large screen is often observed from a relatively close distance as a form of using an image display device. Therefore, an observer may be conscious of an image of a black matrix. In the dot matrix image display devices in the past, an image quality is deteriorated as in an image with less smoothness, an image having roughness, or the like because of the image of the black matrix. For example, in JP-A-8-122709, it is difficult to reduce the deterioration in an image quality due to the image of the black matrix to improve an original image because of an influence of higher diffraction.

Therefore, it is conceivable to make light from the image display device incident on a prism group such that the observer is not conscious of the light shielding section of the black matrix or the like. A flat portion of the prism group transmits the light from the image display device directly. A refractive surface of the prism group refracts and transmits the light from the image display device. The light transmitted through the prism group generates light with an optical path thereof deflected on the refractive surface of the prism group in addition to light traveling straight after exiting from the flat portion. A pixel image can be formed on the black matrix by the light with the optical path thereof deflected. Consequently, the user is conscious of the black matrix less often.

A shape of respective prism elements forming the prism group is fine in the order of micrometer. In the related art, the prism elements of the fine shape are manufactured in a predetermined region by performing, for example, cutting using a cutting tool.

Usually, in the cutting using a cutting tool, a cutting tool having a desired shape is manufactured and prepared in advance. Then, the desired shape is obtained by cutting a member to be cut using this cutting tool. When the cutting tool is manufactured, it is possible to set an angle of the cutting tool by a unit of 0.1°. On the other hand, in the prism elements, it is desired that an angle formed by the flat surface and a slope serving as the refractive surface is in the order of one several hundredth, for example, 0.03°. Therefore, it is impossible to manufacture the cutting tool itself for manufacturing the prism elements.

Even when a microscope or the like is used, accuracy causing an error of about 3 μm is a limit of accuracy for a relative positional relation between a cutting object and a cutting tool, for example, a distance between the cutting tool and the cutting object and alignment concerning flatness (difference of elevation) of a surface of the cutting object. On the other hand, the prism elements are desired to be formed by cutting a substrate at a depth of 2 μm or less. Therefore, even if a machine tool, which performs cutting, is capable of controlling machining in the order of nanometer, the machine tool cannot perform machining for cutting the substrate at a depth of 2 μm or less accurately. Since it is extremely difficult to manufacture the prism elements of a fine shape, machining accuracy tends to be also determined by disturbances, such as temperature and the atmospheric pressure around the machine at the time of machining, temperature of the machine, wearing of the cutting tool, and the like. When fluctuation in the machining accuracy affects a shape of the prism elements, it is difficult to manufacture prism elements at high reproducibility. Therefore, in the cutting using the cutting tool, it is difficult to manufacture the prism elements in a desired prism shape.

SUMMARY

Aspects of the invention can provide a manufacturing method for a fine structure element with which elements of a desired fine shape can be manufactured accurately without depending on a shape of a cutting tool, a fine structure element manufactured by the manufacturing method, a spatial light modulator, and a projector.

An object of the invention, can provide a manufacturing method for a fine structure element including a flat portion forming step of forming a flat portion on a substrate with a cutting section, and a refractive surface forming step of forming a refractive surface having a predetermined angle with respect to the flat portion.

It is assumed that a V-shaped cutting tool having two cutting sections is used as the cutting section. First, a flat portion is formed by cutting a substrate in a state in which the cutting tool is inclined such that one of the cutting sections is substantially horizontal. It is possible to control an amount of inclination of the cutting tool at machine accuracy of about one 100 thousandth according to a usual control method. Next, the cutting tool is returned to a position where a central line thereof is substantially perpendicular to the flat portion to form a refractive surface. Here, it is possible to form a refractive surface having a desired angle with respect to the flat portion by swinging the cutting tool in a desired angle range while fixing a central position of the cutting tool. In this way, the flat portion and the refractive surface are formed using the identical cutting section. Consequently, it is possible to form a refractive section, which is controlled to be accurate and has a fine inclination angle, accurately without depending on a shape of the cutting section. The flat portion formed first serves as a reference plane for the refractive surface forming step. Therefore, even if a wavy shape or a fine uneven shape is present on a surface of the substrate, it is possible to cut the substrate without being affected by the shape.

According to a preferred aspect of the invention, it is preferable that the manufacturing method can include a trial machining step of forming a predetermined shape with the cutting section on the basis of machining data in a trial machining region different from the flat portion, a shape measuring step of measuring the predetermined shape formed in the trial machining step, and a feedback step of feeding back a difference between the measurement data obtained in the shape measuring step and the machining data to the machining data to correct the machining data and the flat portion forming step and the refractive surface forming step are performed on the basis of the corrected machining data.

The fine structure element can be formed on the basis of the cutting data. A desired machining accuracy is not obtained because a shape is affected by disturbance, failure in setting of a relative position of a cutting tool and a work, and the like and is not formed according to the machining data. The machined predetermined shape is actually measured in advance in the trial machining region. In this aspect, it is desirable to use an atomic force microscope, a laser microscope, or an interference microscope to measure a fine shape. Measurement data of the fine shape element and the original machining data are compared to calculate a difference between both the data. The calculated difference is fed back to the machining data. Next, the flat portion forming step, the refractive surface forming step, and the like are performed on the basis of the machining data corrected by an amount of the difference. Consequently, it is possible to perform shape machining with the influence of disturbances and the like reduced. In the substrate in which the fine structure element is formed, it is possible to use an unnecessary region in a peripheral portion as the trial machining region. Another substrate different from the substrate, in which the fine structure element is formed, may be used as the trial machining region. In this case, first, another substrate for trial machining is set in a working machine to correct the machining data according the procedure described above. Then, another substrate is removed from the working machine and a substrate for real machining, in which the fine structure element is built in, is set in the working machine. Lastly, it is possible to apply cutting based on the corrected machining data to the substrate for real machining.

According to a preferred aspect of the invention, it is preferable that the flat portion forming step can include a first flat portion forming step of forming a first flat portion on the substrate with the cutting section, and a second flat portion forming step of cutting the first flat portion by a predetermined depth to form a second flat portion. In the refractive surface forming step, a refractive surface having a predetermined angle with respect to the second flat portion is formed by the cutting section.

According to a preferred aspect of the invention, it is assumed that, for example, a so-called flat cutting tool is used as the cutting section. The substrate is cut by the flat cutting tool to form the first flat portion. Next, the second flat portion is formed in a position at a predetermined depth from the first flat portion. Then, the flat cutting tool is inclined by a predetermined angle. It is possible to control an amount of inclination of the flat cutting tool at a machine accuracy of about one 100 thousandth according to a usual control method. A slope serving as a refractive surface is machined in the refractive surface forming step using the flat cutting tool in an inclined state. Here, after forming the first flat portion, the second flat portion forming step and the refractive surface forming step may be performed in any order. The first flat portion and the refractive surface or the second flat portion and the refractive surface are formed using the identical cutting section. Consequently, it is possible to form a refractive section, which is controlled to be accurate and has a fine inclination angle, accurately without depending on a shape of the flat cutting tool serving as the cutting section. The first flat portion formed first is used as a machining region serving as a reference plane for the second flat portion forming step and the refractive surface forming step. Therefore, even if a wavy shape or a fine uneven shape is present on a surface of the substrate, it is possible to cut the substrate without being affected by the shape.

It is preferable that the manufacturing method can include a trial machining step of forming a predetermined shape with a cutting section on the basis of machining data in a trial machining region different from the first flat portion, a shape measuring step of measuring the predetermined shape formed in the trial machining step, and a feedback step of feeding back a difference between the measurement data obtained in the shape measuring step and the machining data to the machining data to correct the machining data, and the first flat portion forming step, the second flat portion forming step, and the refractive surface forming step are performed on the basis of the corrected machining data.

The fine structure element is formed on the basis of the cutting data. A desired machining accuracy is not obtained because a shape is affected by disturbance, failure in setting of a relative position of a cutting tool and a work, and the like and is not formed according to the machining data. In this aspect the machined predetermined shape is actually measured in advance in the trial machining region. It is desirable to use an atomic force microscope, a laser microscope, or an interference microscope to measure a fine shape. Measurement data of the fine shape element and the original machining data are compared to calculate a difference between both the data. The calculated difference is fed back to the machining data. Next, the first flat portion forming step, the second flat portion forming step, the refractive surface forming step, and the like are performed on the basis of the machining data corrected by an amount of the difference. Consequently, it is possible to perform shape machining with the influence of disturbances and the like reduced. In the substrate in which the fine structure element is formed, it is possible to use an unnecessary region in a peripheral portion as the trial machining region. Another substrate different from the substrate, in which the fine structure element is formed, may be used as the trial machining region. In this case, first, another substrate for trial machining is set in a working machine to correct the machining data according the procedure described above. Then, another substrate is removed from the working machine and a substrate for real machining, in which the fine structure element is built in, is set in the working machine. Lastly, it is possible to apply cutting based on the corrected machining data to the substrate for real machining.

According to a preferred aspect of the invention, it is preferable that the cutting section has at least a first cutting section and a second cutting section. The identical cutting section is used in the first flat portion forming step or the second flat portion forming step and the refractive surface forming step. It is possible to use, for example, a V-shaped cutting tool having the first cutting section and the second cutting section as the cutting section. A refractive surface adjacent to the first flat portion or the second flat portion is formed by a cutting section that is identical with the cutting section used in machining the first flat portion or the second flat portion. For example, when the first flat portion is machined by the first cutting section, a refractive surface adjacent to the first flat portion is formed using the first cutting section. Consequently, it is possible to form a refractive surface having a fine angle accurately.

According to a preferred aspect of the invention, it is preferable that a length of the first flat portion is smaller than a length of the second flat portion in a predetermined section. As described above, the substrate is cut to form the first flat portion in advance. In this case, if a flat cutting tool is used, machining streaks may be left on the surface of the first flat portion. The machining streaks are not preferable because the machining streak cause scattered light when the fine structure element is used as an optical element. In this aspect, the substrate is cut such that the length of the first flat portion is smaller than the length of the second flat portion. The machining streaks are formed at a pitch substantially identical to a width of the flat cutting tool. Therefore, the refractive surface is formed such that the length of the first flat portion is smaller than the length of the second flat portion. Consequently, the machining streaks are scraped off by the cutting section. As a result, it is possible to reduce the scattered light caused by the machining streaks.

According to the invention, it is possible to provide a manufacturing method for a fine structure element that can include an exposing step of exposing a resist layer to light via a grayscale mask having a region where transmissivity of light changes stepwise, and an etching step of etching the resist layer. In this aspect of the invention, the resist layer is etched according to an amount of exposure from the grayscale mask. For example, a mask having a region, in which the amount of exposure is uniform, and a region, in which the amount of exposure changes stepwise, is used. A flat portion is formed in the region where the amount of exposure is uniform. A slope serving as a refractive surface is formed in the region where the amount of exposure changes stepwise. It is possible to control an angle formed by the flat portion and the refractive surface easily according to the transmissivity of the mask. When such a photolithographic technique is used, it is possible to form the flat portion and the refractive surface in a predetermined relative relation and simultaneously. Therefore, it is possible to control an angle formed by the flat portion and the refractive surface and a depth of cutting easily. As a result, it is possible to manufacture a fine structure element in which an angle formed by the flat portion and the refractive surface is very small. The invention is effective for formation of a dioptric element having a slope of a very small angle different from a micro-lens.

In addition, according to the invention, it is possible to provide a manufacturing method for a fine structure element that can include a multiple-exposure step of exposing a resist layer to light plural number of times using plural masks with different areas of openings, and an etching step of etching the resist layer. In the invention, in performing exposure, plural masks are prepared. The respective masks have different sizes of openings. For example, it is assumed that three masks are used. A first mask has plural openings of a fist size. A second mask has plural openings of a second size. A third mask has plural openings of a third size. Here, the sizes of the openings are set such that the second size is larger than the first size and the third size is larger than the second size. Multiple-exposure is performed three times using these three masks. As a result, a region, in which the amount of exposure is uniform, and a region, in which the amount of exposure changes in three steps, are formed in the resist layer. A flat portion is formed in the region where the amount of exposure is uniform. A slope serving as a refractive surface is formed in the region where the amount of exposure changes stepwise. Therefore, it is possible to control an angle formed by the flat portion and the refractive surface easily according to a size of an opening of the mask. As a result, it is possible to manufacture a fine structure element in which an angle formed by the flat portion and the refractive surface is very small. The invention is effective for formation of a dioptric element having a slope section of a very small angle different from the micro-lens.

In addition, according to the invention, it is possible to provide a manufacturing method for a fine structure element that can include an exposure step of exposing a resist layer to light using a mask having different areas of openings depending on a position, and an etching step of etching the resist layer. In the invention, a mask has different areas of openings depending on a position. For example, regions of a dot shape having different areas are distributed appropriately. Consequently, it is possible to form a region, in which transmissivity of the mask is fixed, and a region, in which the transmissivity changes stepwise. The resist layer is exposed to light via this mask. As a result, a region, in which an amount of exposure is uniform, and a region, in which the amount of exposure changes stepwise, are formed in the resist layer. A flat portion is formed in the region where the amount of exposure is uniform. A slope serving as a refractive surface is formed in the region where the amount of exposure changes stepwise. Consequently, it is possible to control an angle formed by the flat portion and the refractive surface easily according to a size and a position of the openings of the mask. As a result, it is possible to manufacture a fine structure element in which the angle formed by the flat portion and the refractive surface is very small. Note that the regions with different areas are formed in a rectangular shape, a strip shape, and the like other than the dot shape. The invention is effective for formation of a dioptric element having a slope section of a very small angle different from the micro-lens.

According to a preferred aspect of the invention, it is preferable that the manufacturing method can further include a substrate shape transferring step of transferring a shape formed on the resist layer to the substrate with etching. Consequently, it is possible to transfer a shape formed on the resist to a substrate of, for example, quartz or glass.

According to a preferred aspect of the invention, it is preferable that the manufacturing method further includes a pattern transferring step of transferring a pattern to another member using the shape formed on the resist layer as a die. For example, Ni or the like is plated in the resist layer, on which a predetermined shape is formed, to form a die. It is possible to manufacture a replica easily using this die.

According to a preferred aspect of the invention, it is preferable that plural dies are formed using a shape formed on the substrate or the resist layer as mother dies and a pattern is transferred to another material using the plural dies. For example, Ni or the like is plated in the resist layer, on which a predetermined shape is formed, to form plural dies. Then, a replica is manufactured using the plural dies. Even if it is difficult to form a single large die, it is possible to manufacture a replica easily by using the plural dies. In addition, since the plural dies are manufactured using the identical mother dies, it is possible to obtain a prism group, which has an accurate shape and is capable of obtaining a uniform and high definition image.

According to a preferred aspect of the invention, it is preferable that a pattern is transferred to a first surface of another member using the first die and transferred to a second surface of another member using the second die. Since the pattern is transferred to the first surface and the second surface using the first die and the second die, respectively, it is possible to form a prism group having prism elements on the first surface and the second surface easily. In addition, since the first die and the second die are manufactured using an identical mother die, it is possible to obtain a prism group that has an accurate shape and is capable of obtaining a uniform and high definition image.

In addition, according to the invention, it is possible to provide a fine structure element that is manufactured by the manufacturing method for a fine structure element. Consequently, it is possible to manufacture a fine structure element that has a flat portion and a refractive surface forming a very small angle with the flat portion.

Still according to the invention, it is possible to provide a spatial light modulator that has the fine structure element. For example, it is possible to obtain a transmission liquid crystal spatial light modulator that has a prism group including micro-prism elements. Since light is transmitted through the prism group in which a predetermined shape is formed, it is possible to deflect emergent light in a predetermined direction accurately. Consequently, it is possible to deflect light from pixels and guide the light onto a projected image of a black matrix section among the pixels of the spatial light modulator. As a result, it is possible to obtain a high quality image without recognizing the black matrix section.

In addition, according to the invention, it is possible to provide a projector that can include a light source that supplies illumination light, the spatial light modulator that modulates the illumination light according to an image signal, and a projection lens that projects the modulated light. In the invention, since the spatial light modulator is provided, it is possible to obtain a high quality projected image.

Still, according to the invention, it is possible to provide a projector that can include a light source that supplies light including first color light, second color light, and third color light, a spatial light modulator for first color light that modulates the first color light according to an image signal, a spatial light modulator for second color light that modulates the second color light according to an image signal, a spatial light modulator that modulates the third color light according to an image signal, a color compounding optical system that compounds the light modulated by the spatial light modulator for first color light, the light modulated by the spatial light modulator for second light, and the light modulated by the spatial light modulator for third color light, and a projection lens that projects light from the color compounding optical system. The projector has the fine structure element in an optical path between the color compounding optical system and the projection lens. In this invention, since the fine structure element is provided, it is possible to obtain a high quality projected image.

BRIEF DESCRIPTION OF THE DRAWINGS

This invention will be described with reference to the accompanying drawings, wherein like numerals reference like elements, and wherein.

DETAILED DESCRIPTION OF EMBODIMENTS

A projector 100 according to a first exemplary embodiment of the invention will be explained in detail with reference to the accompanying drawings. It should be understood that the invention is not limited by this exemplary embodiment.

Figure 1:
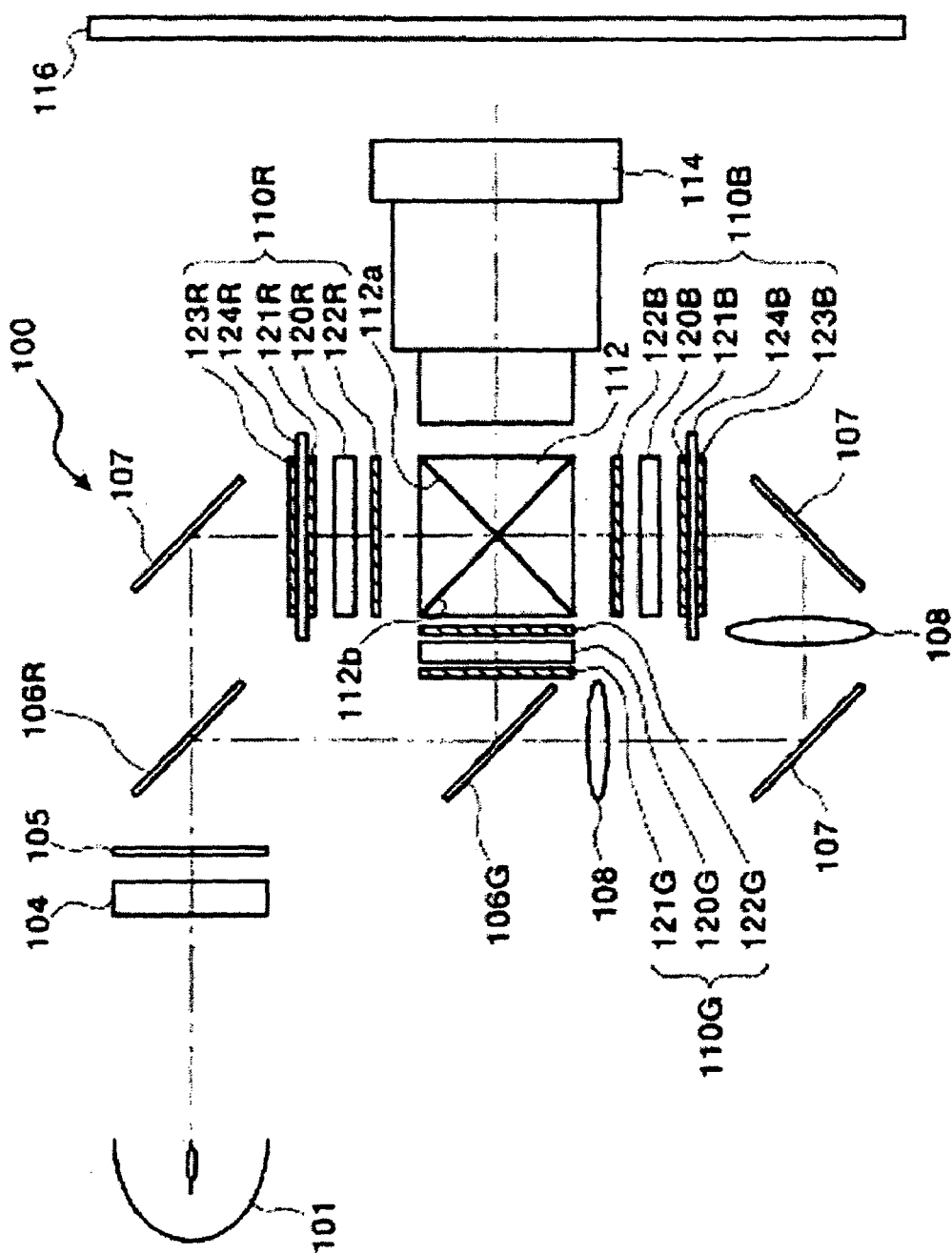
FIG. 1 is an exemplary schematic diagram of a projector according to a first embodiment of the invention.

First, a schematic structure of a projector according to a first exemplary embodiment of the invention will be explained with reference to FIG. 1. Next, a schematic structure of this exemplary embodiment will be explained with reference to FIG. 2 and subsequent figures. In FIG. 1, an ultra-high pressure mercury lamp 101 serving as a light source supplies red light (hereinafter referred to as "R light") serving as first color light, green light (hereinafter referred to as "G light") serving as second color light, and blue light (hereinafter referred to as "B light") serving as third color light. An integrator 104 uniformalizes an illuminance distribution of light from the ultra-high pressure mercury lamp 101. The light with the illuminance distribution uniformalized is converted into polarized light having a specific oscillation direction, for example, an s-polarized light by a polarized light converting element 105. The light converted into the s-polarized light is made incident on an R light transmitting dichroic mirror 106R that constitutes a color separation optical system. The R light will be hereinafter explained. The R light transmitting dichroic mirror 106R transmits the R light and reflects the G light and the B light. The R light transmitted through the R light transmitting dichroic mirror 106R is made incident on the reflection mirror 107. The reflection mirror 107 bends an optical path of the R light 90 degrees. The R light with the optical path bent is made incident on the spatial light modulator for first color light 110R that modulates the R light serving as the first color light according to an image signal. The spatial light modulator for first color light 110R is a transmission liquid crystal display device that modulates the R light according to an image signal. Note that, since a polarizing direction of light does not change even if the light is transmitted through a dichroic mirror, the R light made incident on the spatial light modulator for first color light 110R keeps a state of the s-polarized light.

The spatial light modulator for first color light 110R includes a λ/2 phase difference plate 123R, a glass plate 124R, a first polarizing plate 121R, a liquid crystal panel 120R, and a second polarizing plate 122R. A detailed structure of the liquid crystal panel 120R will be described later. The λ/2 phase difference plate 123R and the first polarizing plate 121R are arranged in contact with a light-transmissive glass plate 124R that does not convert a polarizing direction. Consequently, it is possible to prevent the first polarizing plate 121R and the λ/2 phase difference plate 123R from warping because of heat generation. Note that, although the second polarizing plate 122R is provided independently in FIG. 1, the second polarizing plate 122R may be arranged in contact with an exit surface of the liquid crystal panel 120R or an incident surface of a cross dichroic prism 112.

The s-polarized light made incident on the spatial light modulator for first color light 110R is converted into p-polarized light by the λ/2 phase difference plate 123R. The R light converted into the p-polarized light is transmitted through the glass plate 124R and the first polarizing plate 121R directly and made incident on the liquid crystal panel 120R. In the p-polarized light made incident on the liquid crystal panel 120R, the R light is converted into the s-polarized light according to modulation corresponding to an image signal. The R light converted into the s-polarized light by the modulation of the liquid crystal panel 120R exits from the second polarizing plate 122R. The R light modulated by the spatial light modulator for first color light 110R in this way is made incident on the cross dichroic prism 112 serving as a color compounding optical system.

Next, the G light will be explained. Optical paths of the G light and the B light reflected by the R light transmitting dichroic mirror 106R are bent 90 degrees. The G light and the B light having the optical path bent are made incident on the B light transmitting dichroic mirror 106G. The B light transmitting dichroic mirror 106G reflects the G light and transmits the B light. The G light reflected by the B light transmitting dichroic mirror 106G is made incident on a spatial light modulator for second color light 110G that modulates the G light serving as the second color light according to an image signal. The spatial light modulator for second color light 110G is a transmission liquid crystal display device that modulates the G light according to an image signal. The spatial light modulator for second color light 110G has a liquid crystal panel 120G, a first polarizing plate 121G, and a second polarizing plate 122G. Details of the liquid crystal panel 120G will be described below.

The G light made incident on the spatial light modulator for second color light 110G has been converted into the s-polarized light. The s-polarized light made incident on the spatial light modulator for second color light 110G is transmitted through the first polarizing plate 121G directly and made incident on the liquid crystal panel 120G. In the s-polarized light made incident on the liquid crystal panel 120G, the G light is converted into p-polarized light according to modulation corresponding to an image signal. The G light converted into the p-polarized light by the modulation of the liquid crystal panel 120G exits from the second polarizing plate 122G. The G light modulated by the spatial light modulator for second color light 110G is made incident on the cross dichroic prism 112 serving as a color compounding optical system.

Next, the B light will be explained. The B light transmitted through the B light transmitting dichroic mirror 106G is made incident on a spatial light modulator for third color light 110B, which modulates the B light serving as the third color light according to an image signal, through two relay lenses 108 and two reflection mirrors 107. The spatial light modulator for third color light 110B is a transmission liquid crystal display device that modulates the B light according to an image signal.

Note that the B light is caused to travel through the relay lenses 108 because a length of the optical path of the B light is larger than lengths of the optical paths of the R light and the G light. It is possible to guide the B light transmitted through the B light transmission dichroic mirror 106G to the spatial light modulator for third color light 110B directly by using the relay lenses 108. The spatial light modulator for third color light 110B has a λ/2 phase difference plate 123B, a glass plate 124B, a first polarizing plate 121B, a liquid crystal panel 120B, and a second polarizing plate 122B. Note that, since a structure of the spatial light modulator for third color light 110B is the same as the structure of the spatial light modulator first color light 110R described above, detailed explanations of the structure of the spatial light modulator for third color light 110B are omitted.

The B light made incident on the spatial light modulator for third color light 110B has been converted into the s-polarized light. The s-polarized light made incident on the spatial light modulator for third color light 110B is converted into the p-polarized light by the λ/2 phase difference plate 123B. The B light converted into the p-polarized light is transmitted through the glass plate 124B and the first polarizing plate 121B directly and made incident on the liquid crystal panel 120B. In the p-polarized light made incident on the liquid crystal panel 120B, the B light is converted into the s-polarized light according to modulation corresponding to an image signal. The B light converted into the s-polarized light according to the modulation of the liquid crystal panel 120B exits from the second polarizing plate 122B. The B light modulated by the spatial light modulator for third color light 110B is made incident on the cross dichroic prism 112 serving as a color compounding optical system. In this way, the R light transmitting dichroic mirror 106R and the B light transmitting dichroic mirror 106G constituting a color separation optical system separate light supplied from the ultra-high pressure mercury lamp 101 into the R light serving as the first color light, the G light serving as the second color light, and the B light serving as the third color light.

The cross dichroic prism 112 serving as a color compounding optical system includes two dichroic films 112a and 112b that are crossed in an X shape. The dichroic film 112a reflects the B light and transmits the R light and the G light. The dichroic film 112b reflects the R light and transmits the B light and the G light. In this way, the cross dichroic prism 112 compounds the R light, the G light, and the B light that are modulated by the spatial light modulator for first color light 110R, the spatial light modulator for second color light 110G, and the spatial light modulator for third color light 110B, respectively. A projection lens 114 projects light compounded by the cross dichroic prism 112 on a screen 116. Consequently, it is possible to obtain a full color image on the screen 116.

Note that, as described above, the light made incident on the cross dichroic prism 112 from the spatial light modulator for first color light 110R and the spatial light modulator for third color light 110B is set to be the s-polarized light. The light made incident on the cross dichroic prism 112 from the spatial light modulator for second color light 110G is set to be the p-polarized light. A polarizing direction of the light made incident on the cross dichroic prism 112 is varied, whereby it is possible to compound lights that exit from the spatial light modulators for respective color lights effectively in the cross dichroic prism 112. The dichroic films 112a and 112b are usually excellent in an s-polarized light reflection characteristic. Therefore, the R light and the B light reflected by the dichroic films 112a and 112b are set as the s-polarized light and the G light transmitted through the dichroic films 112a and 112b is set as the p-polarized light.

Next, details of a liquid crystal panel will be explained with reference to FIG. 2. The projector 100 explained with reference to FIG. 1 can include the three liquid crystal panels 120R, 120G, and 120B. These three liquid crystal panels 120R, 120G, and 120B have an identical basic structure except that wavelength regions of light modulated by the liquid crystal panels 120R, 120G, and 120B are different. Therefore, the following explanations are made with the liquid crystal panel 120R as a representative example.

Figure 2:
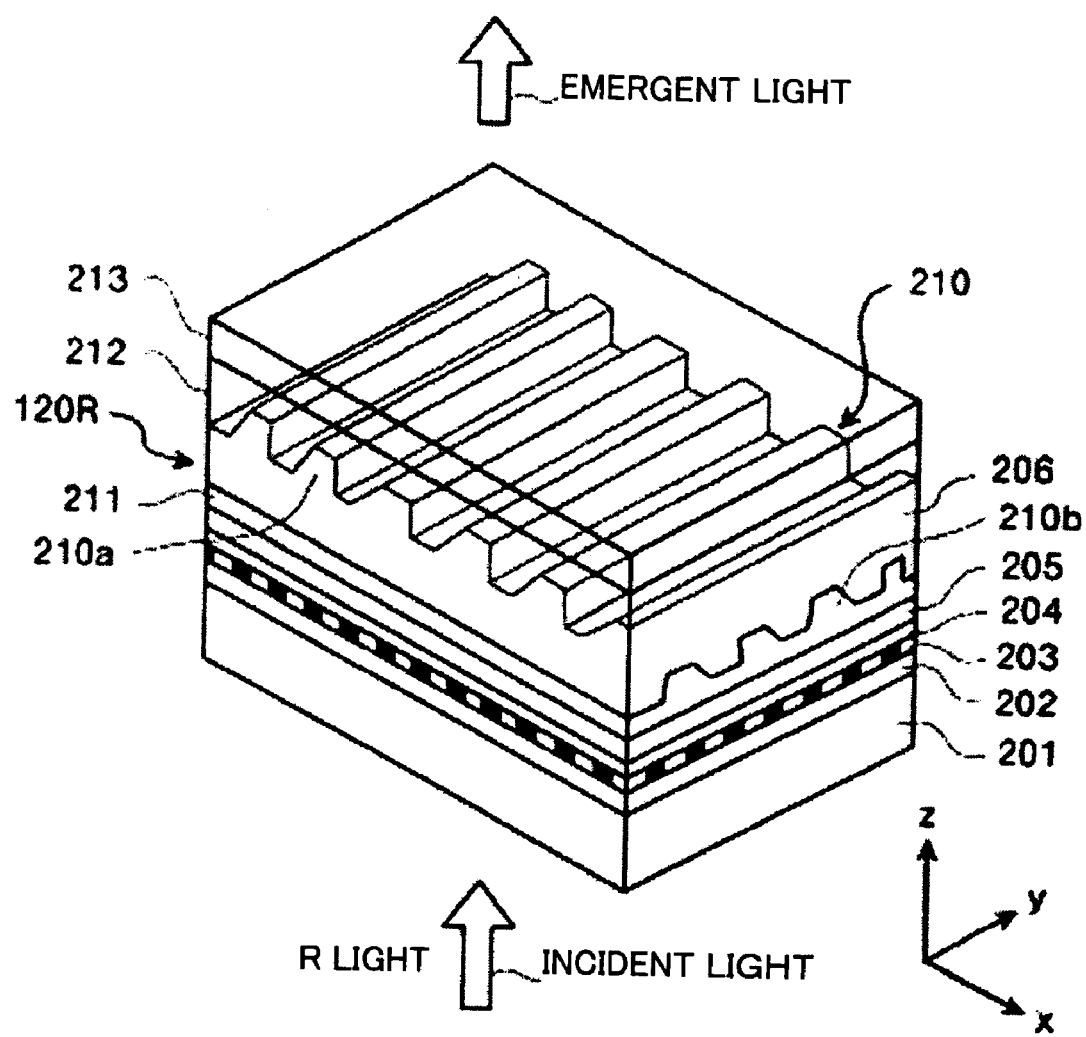
FIG. 2 is an exemplary schematic diagram of a liquid crystal panel in the first embodiment.

FIG. 2 is a perspective sectional view of the liquid crystal panel 120R. The R light from the ultra-high pressure mercury lamp 101 is made incident on the liquid crystal panel 120R from a lower side of FIG. 2 and exits in a direction of the screen 116 from an upper side in the figure. An opposed substrate 202 having a transparent electrode and the like is formed on an inner side of an incidence side dust-proof transparent plate 201. A TFT substrate 205 having a thin film transistor (TFT), a transparent electrode, and the like is formed on an inner side of an exit side dust-proof transparent plate 206. The opposed substrate 202 and the TFT substrate 205 are opposed to each other to stick the incidence side dust-proof transparent plate 201 and the exit side dust-proof transparent plate 206 together.

A liquid crystal layer 204 for image display is sealed between the opposed substrate 202 and the TFT substrate 205. A black matrix forming layer 203 for light shield is provided on an incident light side of the liquid crystal layer 204, for example, on the opposed substrate 202. The prism group 210 is fastened to the TFT substrate 205 via an adhesion layer 211 on the incidence side.

Figure 3A:
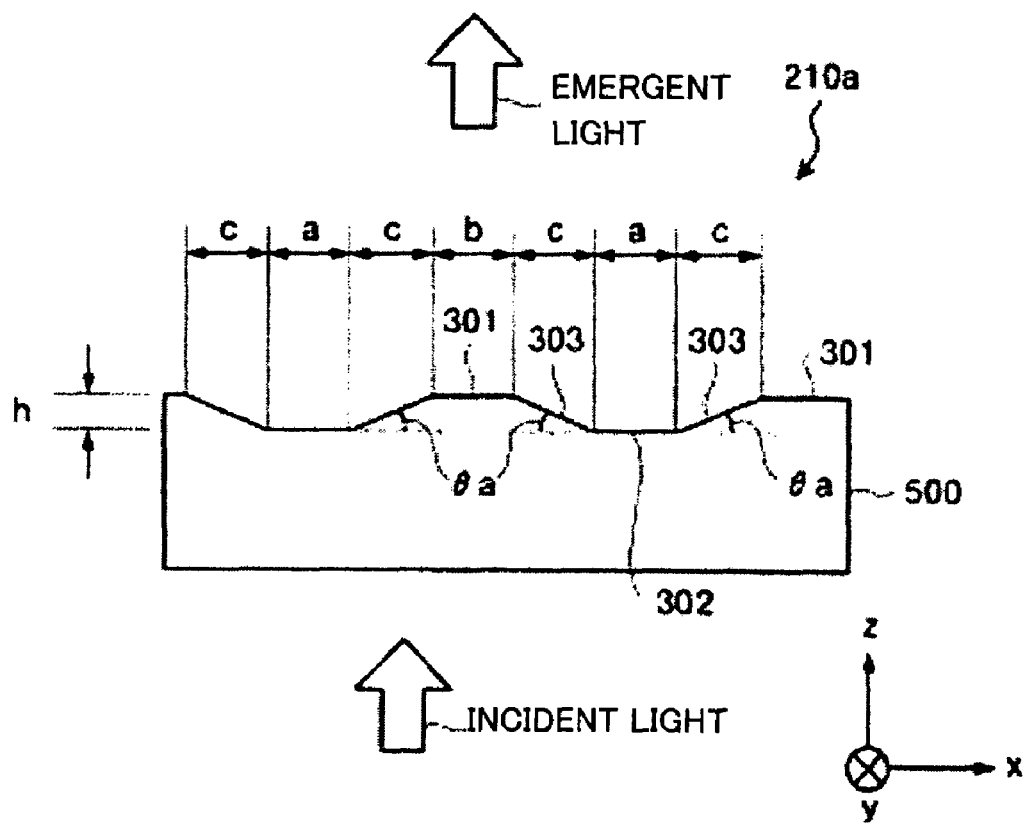
FIG. 3A is an exemplary sectional schematic diagram of a prism group.

The prism group 210 is fastened to a cover glass 213 via an adhesion layer 212 on the exit side. The prism group 210 includes two sets of prism elements orthogonal to each other. FIG. 3A shows a structure of a prism element 210a on the exit side of the two sets of prisms forming the prism group 210. The prism element 210a has substantially a trapezoidal shape as a sectional shape in an x-axis direction. In addition, the prism element 210a has a longitudinal direction in a y-axis direction substantially orthogonal to the x-axis direction. Two slopes 303 in the trapezoidal shape as a sectional shape in an x-axis direction of the prism element 210a function as refractive surfaces. An upper flat surface 301 in the trapezoidal shape as a sectional shape in an x-axis direction of the prism element 210a functions as a first flat portion. A lower flat surface 302 functions as a second flat portion.

The slopes 303 serving as refractive surfaces form a predetermined angle θa with respect to the lower flat surface 302. Therefore, light made incident on the slopes 303 is refracted in a direction corresponding to the angle θa of the slopes 303. The angle θa is, for example, about 0.03 to 0.06°. Then, a refracted transmission image is formed by the refracted light. Light made incident on the upper flat surface 301 or the lower flat surface 302 is transmitted directly. A direct transmission image is formed by the light transmitted directly.

Referring back to FIG. 2, the prism element 210b of the two sets of prisms forming the prism group 210 is provided further on the incidence side than the prism element 210a. A structure of the prism element 210b is substantially identical to a structure of the prism element 210a shown in FIG. 3A. The prism element 210b has substantially a trapezoidal shape as a sectional shape in the y-axis direction. In addition, the prism element 210b has a longitudinal direction in the x-axis direction. Therefore, the prism element 210a and the prism element 210b are arranged such that the longitudinal directions thereof are substantially orthogonal to each other. Not shown other sets of prism elements have the same structure as the prism elements 210a and 210b. Two sets of prism elements of the other sets of prism elements are also provided such that longitudinal directions thereof are substantially orthogonal to each other.

Light is transmitted through the prism element 210a on which a desired shape is formed, whereby it is possible to refract and deflect a direction of exit light accurately in a predetermined direction. Consequently, it is possible to refract light from pixels and guide the light onto a projected image in the black matrix section among the pixels of the spatial light modulators for respective color lights 110R, 110G, and 110B. As a result, it is possible to obtain a high quality image without recognizing the black matrix section. In addition, according to the projector 100 including the spatial light modulators for respective color lights 110R, 110G, and 110B, it is possible to obtain a high quality projected image.

Figure 4:
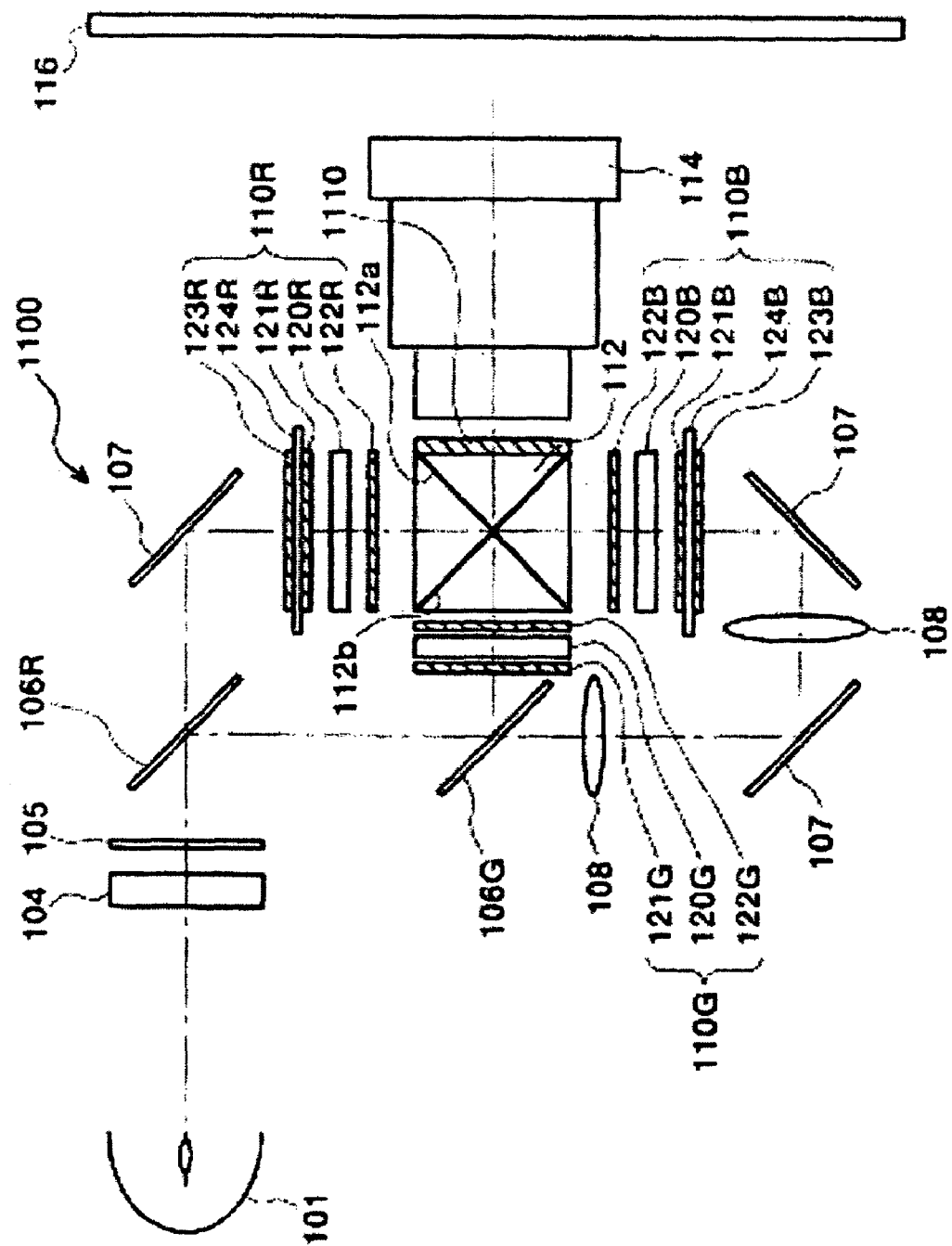
FIG. 4 is an exemplary diagram for explaining an arrangement position of the prism group.

Note that, in the structure shown in FIG. 1, the first polarizing plate 121R and the second polarizing plate 122R are provided separately from the liquid crystal panel 120R. However, instead of the liquid crystal panel 120R, it is also possible to provide a polarizing plate between the incidence side dust-proof transparent plate 201 and the opposed substrate 202, between the exit side dust-proof transparent plate 206 and the TFT substrate 205, and the like. As in a projector 1100 shown in FIG. 4, a prism group 1110 may be arranged between the cross dichroic prism 112 and the projection lens 114. Moreover, the prism group 1110 may be arranged between the projection lens 114 and the screen 116.

Since the respective color lights compounded by the cross dichroic prism 114 are made incident on the prism group 210, only one prism group 210 is required and it is possible to simplify the projector 100. The prism group 210 may be formed on the second polarizing plate 122R or the incidence surface of the R light of the cross dichroic prism 112. If the prism group 210 is provided for each color light, it is possible to set a refraction angle corresponding to each wavelength.

A modulation surface of spatial light modulator 110R and the screen 116 are in a conjugate relation. Therefore, a certain point on the modulation surface of the spatial light modulator 110R is focused on a certain point on the screen 116. Light from one point on the spatial light modulator 110R diffuses at a predetermined spatial spread angle and is transmitted through a predetermined circular region on the prism group 210. An area of this circular region is assumed to be a unit area. Light transmitted through the circular region having the unit area on the prism group 210 is focused on one point on the screen 116. The unit area is determined according to an F number of an illumination system or an F number of a projection system.

In the prism group 210, it is desirable to provide the prism elements 210a and 210b at a period of three or more and fifteen or less per the unit area. Here, the period of the prism element 210a and 210b is the number of edges in a boundary of the prism elements 210a and 210b. and is the number of edges of the prism elements 210a and 210b substantially perpendicular to a straight line along a diameter of the circular region having the unit area. As one structure in which diffracted light is generated by the prism group 210, a periodical structure of the prism group 210 in the region of the unit area can be cited as an example. Since the prism elements 210a and 210b are provided at the period of three or more and fifteen or less per the unit area, it is possible to reduce generation of diffracted light due to the periodical structure of the prism group 210. Besides, the prism elements 210a and 210b are provided such that there are three or more and fifteen or less prism elements per the unit area, whereby it is possible to reduce generation of diffracted light due to the periodical structure of the prism group 210. It is possible to display a high definition image by reducing generation of diffracted light.

It is also desirable to provide the prism elements 210a and 210b at a period of five or more and twelve or less per the unit area or provide five or more and twelve or less prism elements 210a and 210b per the unit area in the prism group 210. Moreover, it is desirable to provide the prism elements 210a and 210b at a period of five or more and ten or less per the unit area or five or more and ten or less prism elements 210a and 210b per the unit area in the prism group 210. Consequently, it is possible to further reduce generation of diffracted light and display a higher definition image. In the prism group 210, prism elements may be formed in a random shape in a region of the unit area or prism elements may be arranged at random. It is possible to reduce generation of diffracted light and display a high definition image by making a shape or an arrangement of prism element aperiodic.

Figure 5:
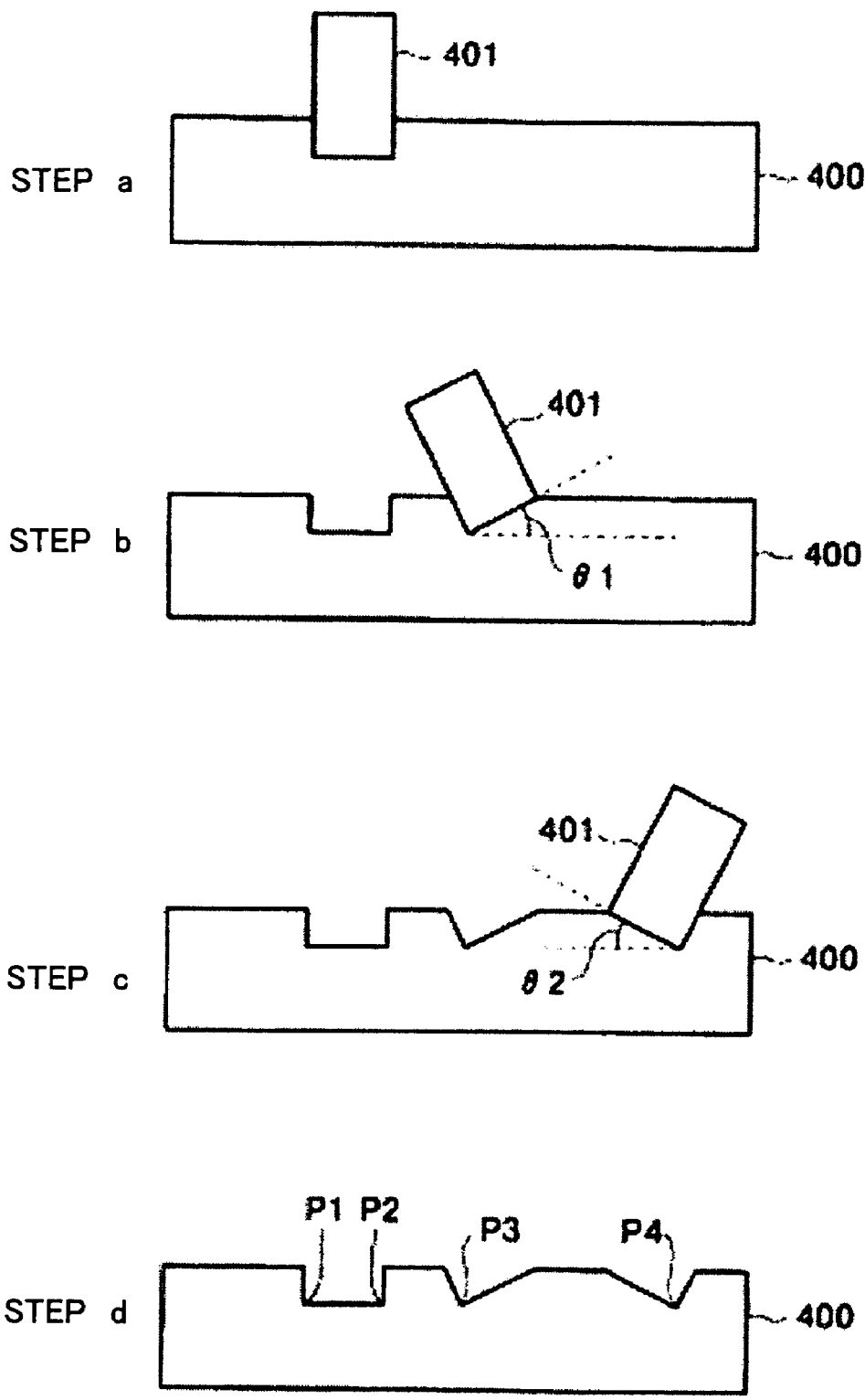
FIG. 5 is an exemplary diagram for explaining trial machining in a second embodiment of the invention.
Figure 6A:
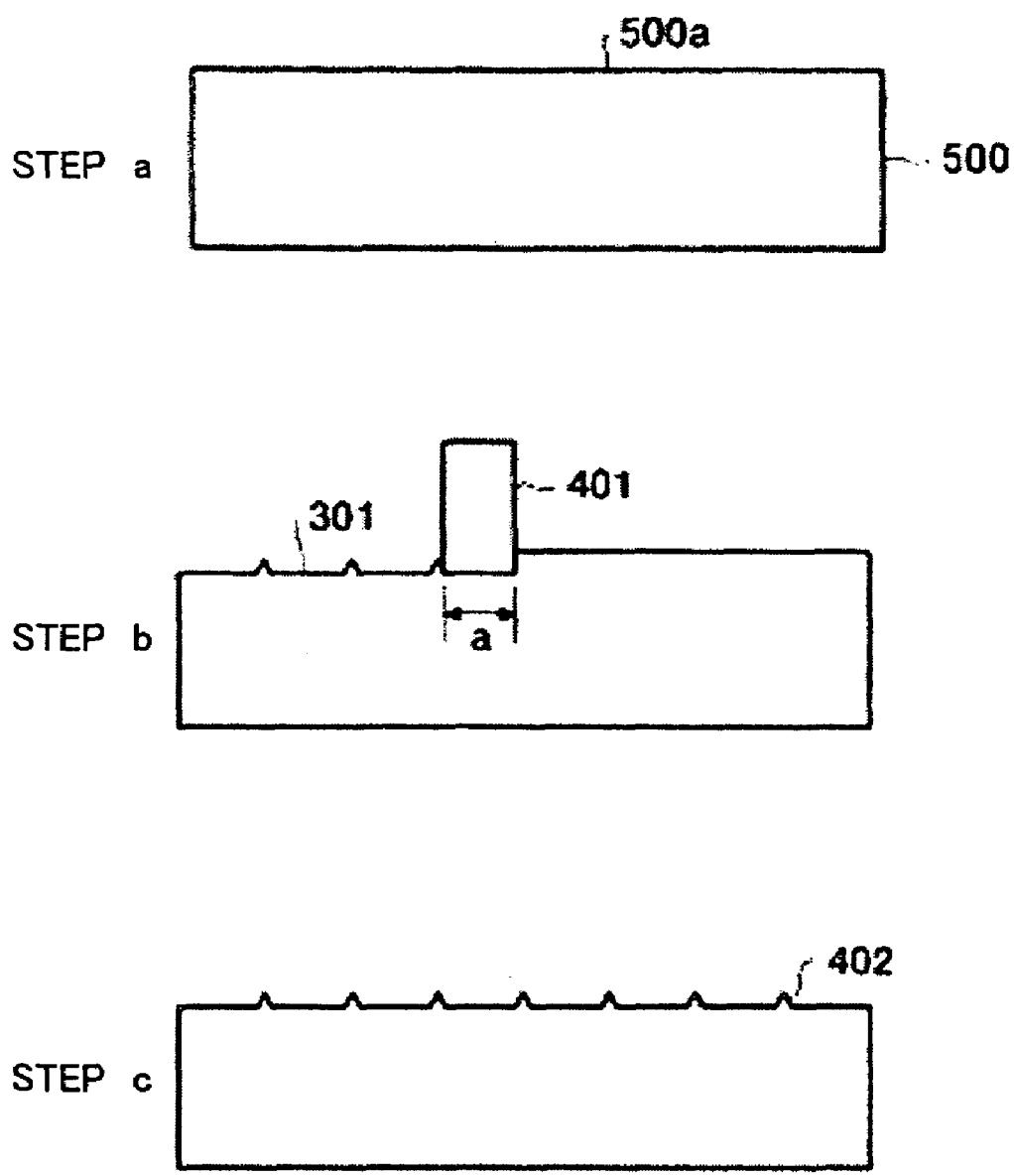
FIGS. 6A and 6B are exemplary diagrams for explaining real machining in the second embodiment.

A manufacturing method for the prism element 210a of the prism group 210 serving as a fine structure element according to a second exemplary embodiment of the invention will be explained with reference to FIGS. 5, 6A, and 6B.

In this exemplary embodiment, a trial machining process is performed as a preprocess of a process for forming the prism element 210a. In a trial machining step indicated by step "a" in FIG. 5, a planar substrate for trial machining 400, which is another substrate, is cut by a flat cutting tool 401. Next, as indicated by step "b" in FIG. 5, the flat cutting tool 401 is inclined by an angle θ1. Then, the substrate 400 is cut by the inclined flat cutting tool 401 to form a slope. As indicated by a step "c" in FIG. 5, the flat cutting tool 401 may be inclined by an angle θ2 different from the angle θ1 to form a slope. In a shape measurement step indicated by step "d" in FIG. 5, for example, depths, angles, and the like of the machined shapes are measured at edges P1, P2, P3, and P4. Then, a difference between machining data set in a cutting machine and measurement data obtained in the shape measurement step is fed back to the machining data to correct the machining data. The corrected data is stored in the cutting machine. When a prism element described below is formed using the cutting tool, cutting is performed on the basis of the corrected data.

Here, in the trial machining processing, a relative positional relation of the flat portion and the slope corresponds to a positional relation of the substrate for trial machining 400 and the cutting machine. Therefore, the trial machining may be applied to a region that is a part of the substrate forming the prism element 210a serving as a fine structure element or may be applied to a separate substrate that is different from the substrate forming the prism element 210a serving as a fine structure element.

Next, a real machining following the trial machining will be explained with reference to FIGS. 6A and 6B. In step "a" in FIG. 6A, a substrate 500 different from the substrate for trial machining 400, to which the trial machining is applied, is used. In steps explained below, cutting is performed on the basis of the machining data corrected as described above. The substrate for trial machining 400, to which the trial machining is applied, is removed from a not-shown working machine. Next, the substrate 500 for real machining is attached to the working machine.

In the flat portion forming step, a flat portion is formed in the substrate 500 by a cutting section. The flat portion forming step includes a first flat portion forming step of forming a first flat portion in the substrate 500 with a cutting section and a second flat portion forming step of cutting the first flat portion by a predetermined depth with the cutting section to form a second flat portion. In the first flat portion forming step indicated by step "b" in FIG. 6A, an upper flat surface 301 serving as the first flat portion is cut in the substrate 500 with the flat cutting tool 401 serving as a cutting section. Next, the flat cutting tool 401 moves by a length "a" of a blade of the cutting tool. The flat cutting tool 401 cut the upper flat surface 301 again. The upper flat surface 301 of a continuous shape is formed by repeating this process.

The upper flat surface 301 serves as a reference plane when a lower flat surface 302 described later is formed. A wavy shape or a very small uneven shape may be present in the machining surface 500a of the substrate 500. Even in this case, in the first flat portion forming step, the wavy shape or the uneven shape is cut by the flat cutting tool 401. Consequently, it is possible to perform accurate cutting without being affected by the wavy shape or the like of the machining surface 500a of the substrate 500. In addition, as indicated by step "c" in FIG. 6A, machining streaks 402 are formed at intervals of a length "a" along a direction in which the flat cutting tool 401 cuts the substrate.

Figure 6B:
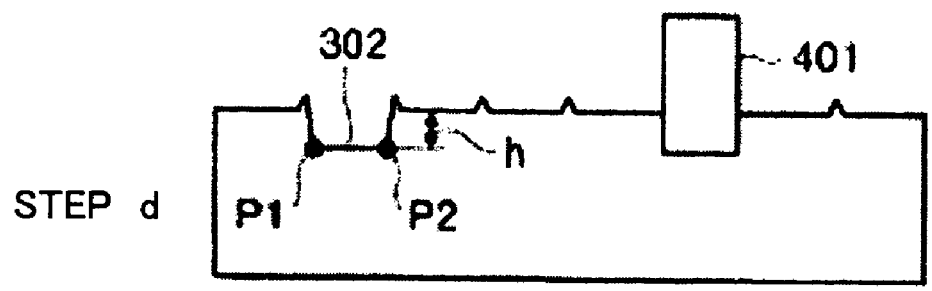
Figure 6B:
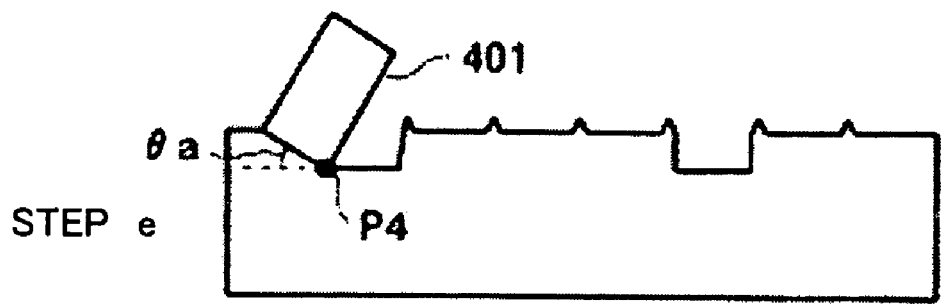
Figure 6B:
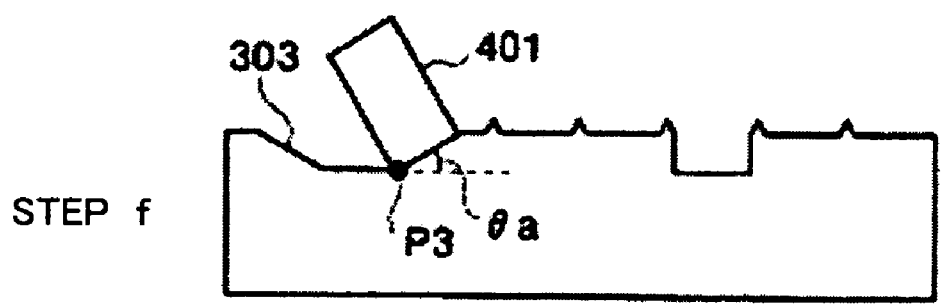

As indicated by step "d" in FIG. 6B, in the second flat portion forming step, the flat cutting tool 401 cuts the substrate by a predetermined depth h from the upper flat surface 301 serving as the first flat portion. Consequently, the lower flat surface 302 serving as the second flat portion is formed. The flat cutting tool 401 then moves to a position set in advance where the next lower flat surface 302 of the prism element is formed. Then, the lower flat surface 302 is cut in the position. All the lower flat surfaces 302 are formed by repeating this process.

In a refractive surface forming step indicated by step "e" and step "f" in FIG. 6B, the flat cutting tool 401 is inclined by a predetermined angle θa. In the refractive surface forming step, the slope 303 serving as a refractive surface having the predetermined angle θa with respect to the lower flat surface 302 is formed by the flat cutting tool 401 serving as the cutting section. In the working machine, it is possible to control an angle of inclination of the flat cutting tool 401 at accuracy of, for example, about one 100 thousandth. The angle of inclination of the flat cutting tool 401 corresponds to an angle formed by a flat surface and a refractive surface of a prism element serving as a fine structure element that s manufactured finally. Therefore, it is possible to manufacture a prism element having the very small angle θa extremely accurately. In this embodiment, the angle θa is, for example, about 0.03° to 0.06°. In addition, cutting is performed such that an edge portion P1 (step d) of the lower flat surface 302 and an edge portion P4 (step e) of the slope 303 adjacent to the lower flat surface 302 coincide with each other. Cutting is also performed such that an edge portion P2 (step d) of the lower flat surface 302 and an edge portion P3 (step f) of the slope 303 adjacent to the lower flat surface 302 coincide with each other. Moreover, when the slope 303 is cut, machining is performed such that the machining streaks 402 formed on the upper flat surface 301 are scraped and removed, In order to remove the machining streaks 402, a position, an angle, an amount of cutting of the flat cutting tool 401 are controlled such that a length "b" of the upper flat surface 301 is smaller than a length "a" of the lower flat surface 302. Consequently, no machining streak 402 is formed in the prism element manufactured finally. As a result, it is possible to reduce scattered light due to the machining streaks 402. In addition, when an area of the upper flat surface 301 is set as Sa, an area of the lower flat surface 302 is set as Sb, and areas of two refractive surfaces adjacent to one lower flat surface 302 are set as Sc1 and Sc2, respectively, it is desirable that the following condition is satisfied.

$$Sa:Sc1:Sc2:Sb=1.2:0.85:0.85:0.80$$

Consequently, it is possible to reduce the influence of the black matrix described above and obtain a firm and sharp projected image. In addition, in this exemplary embodiment, the lower flat surface 302 serving as the second flat portion and the slope 303 serving as the refractive surface adjacent to the lower flat surface 302 are formed using the identical flat cutting tool 401 serving as the cutting section. Consequently, it is possible to form the slop 303 serving as the refractive portion with the very small inclination angle θa controlled highly accurately without depending on a shape of the flat cutting tool 401 serving as the cutting section. In addition, first of all, the upper flat surface 301 serving as the first flat portion is cut in the substrate 500 by the flat cutting tool 401. Consequently, the formed upper flat surface 301 serving as the first flat portion is used as a machining region for the following second flat portion forming step and the refractive surface forming step. Therefore, even if there is a wavy shape or a fine uneven shape on the surface of the substrate 500, it is possible to cut the substrate 500 without being affected by the wavy shape or the uneven shape.

It should be understood that the substrate 500 is not limited to a parallel flat plate made of a glass member but may be, for example, transparent resin, such as acrylic. It is also possible to apply plating treatment to a parallel flat plate, on which a fine shape is formed, to manufacture a die. In this case, a mold die is formed from the substrate 500 on which a prism element is formed. Then, a pattern is transferred from the die to another member, for example, optical transparent resin to manufacture a prism group. Consequently, it is possible to further reduce manufacturing cost. In addition, in order to manufacture a die directly, a hard member such as heavy alloy (product name) may be machined by the method described above. Then, a prism group is manufactured in a transfer step with the machined hard member as a die. A unit area on a die and an area of a flat portion and an area of a refractive surface per the unit area in the transferred prism group are identical in the prism group formed by copying according to transfer. Therefore, even if unevenness of the shape is reversed, the function as the optical element remains the same.

Figure 3B:
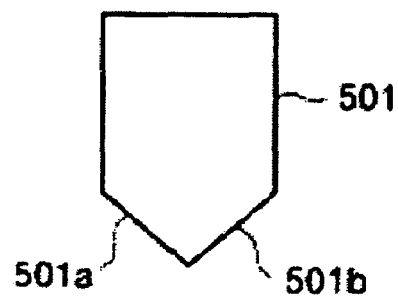
FIG. 3B is an exemplary diagram of a modification of a cutting section.

In this exemplary embodiment, the flat cutting tool 401 is used as the cutting section. However, it should be understood that the cutting section is not limited to this. For example, as shown in FIG. 3B, it is also possible to use a V-shaped cutting tool 501 having a first cutting section 501a and a second cutting section 501b. In this case, it is desirable to form the upper flat surface 301 and the slope 303 adjacent to the upper flat surface 301 with an identical cutting section, for example, the first cutting section 501a. It is also desirable to form the lower flat surface 302 and the slope 303 adjacent to the lower flat surface 302 with an identical cutting section, for example, the second cutting section 501b. In both the cases, it is desirable to make an edge of the flat surface and an edge of the slope identical. Consequently, it is possible to manufacture the prism element 210a with the very small angle θa highly accurately.

Figure 7:
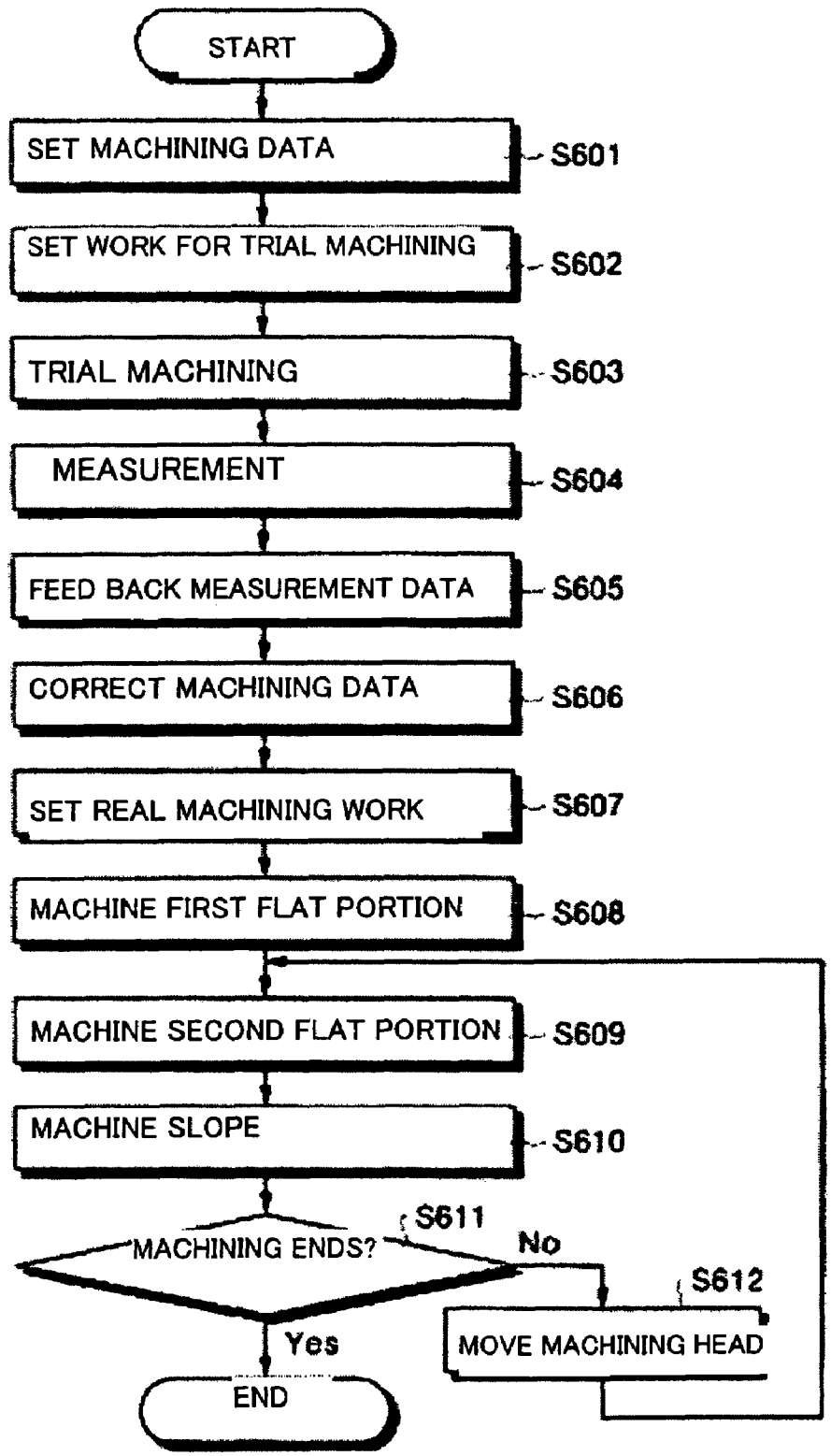
FIG. 7 is an exemplary diagram for explaining a manufacturing procedure in the second embodiment.

Next, a flow of the manufacturing procedure will be explained with reference to FIG. 7. First, in step S601, an operator inputs machining data for forming a desired fine shape such as a machining position, a machining angle, a machining depth, the number of revolutions of a cutting tool, and machining speed to a control section of a working machine. Then, the operator attaches a cutting tool of a necessary shape, for example, a flat cutting tool to a cutting tool holder of the working machine. In step S602, the operator sets a substrate, which is a work for trial machining, in a holder of the working machine. The substrate which is a work is, for example, parallel flat plate glass. In step S603, the operator applies trial machining for a groove having shapes of the edges P1, P2, P3, and P4 to the substrate.

In step S604, the operator measures a depth, an angle of a slope, a pitch, and the like of the trial-machined groove shape using a laser microscope, an atomic force microscope, or an interference optical measurement device without removing the parallel flat plate glass from the work holder. It is desirable that a parameter of measurement data is at least one of a pitch, an angle, a depth, and roughness of a flat surface. In addition, even if the parallel flat plate glass, which is a measurement object, is removed from the work holder to perform measurement, it is possible to obtain information necessary for feedback by measuring a relative relation of machining shapes.

In step S605, the operator feeds back a difference between measurement data and machining data to the machining data. In addition, the operator removes the work for trial machining from the holder of the working machine. Then, in step S607, the operator sets a work for real machining in the holder of the working machine. In step S606, the operator corrects the machining data on the basis of the fed-back difference value. More specifically, the operator corrects a machining angle, a cutting depth, and a pitch of the cutting tool, a parameter for flat surface machining, and the like. For example, the operator corrects the machining angle, a cutting depth, the groove pitch, and the parameter for flat surface machining according to angle correction for the cutting tool, depth correction for the cutting tool, and feed pitch correction. The process for trial machining ends here.

Next, in step S608, the operator cuts the upper flat surface 301 serving as the first flat portion (step b in FIG. 6A) on the basis of the corrected data. In step S609, the operator moves the flat cutting tool 401 to a predetermined position to form the lower flat surface 302 serving as the second flat portion having a depth h (step d in FIG. 6B). Next, in step S610, the operator inclines the flat cutting tool 401 by the angle θa to form the slope 303 serving as the refractive surface.

In step S611, the operator judges whether the machining of a groove of a predetermined shape ends. If the machining does not end ("No" in step S611), in step S612, the operator moves a position of the machining head, in which the flat cutting tool 401 is held, according to the procedure described above. Then, the operator repeats the machining in steps S609 and S610. If the machining ends ("Yes" in step S611), the operator ends the machining. Consequently, it is possible to perform shape machining with influence such as disturbance reduced. In addition, as described above, an identical substrate may be used for the substrate for trial machining and the substrate for real machining.

Figure 8:
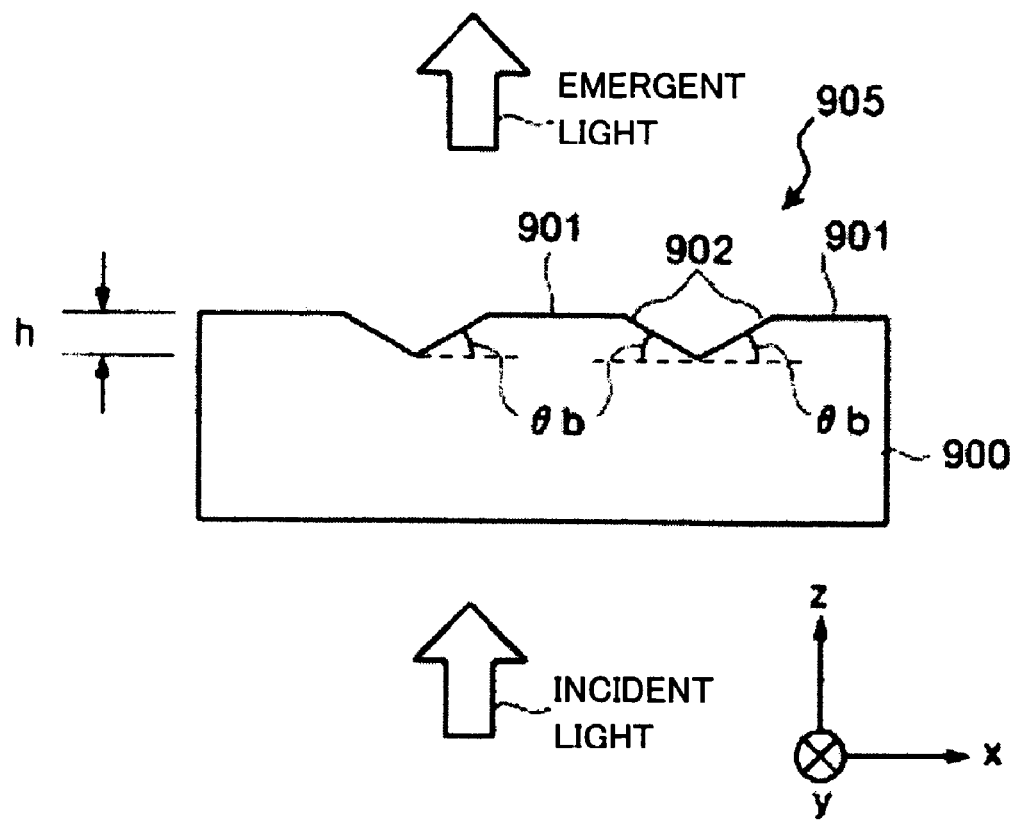
FIG. 8 is an exemplary schematic sectional view of a prism group.

FIG. 8 shows a schematic structure of a section of a prism element 905 manufactured by a manufacturing method for a fine structure element according to a third exemplary embodiment of the invention. It is possible to apply the prism element 905 to the projector 100. Explanations repeating the explanations of the first and the second embodiments are omitted. The prism element 905 has flat surfaces 901 serving as flat portions and slopes 902 serving as refracted surfaces. The prism element 905 has substantially a trapezoidal shape as a sectional shape in an x-axis direction and has a longitudinal direction in a y-axis direction.

The prism element 905 is different from the prism element 210a (see FIG. 3A) in that there is no flat surface between the substantial trapezoidal shapes and the slopes 902 are adjacent to each other. The slopes 902 form a predetermined angle θb with respect to a surface parallel to the flat surfaces 901. The angle θb is, for example, about 0.03 to 0.06° like the angle θa of the slopes 303 of the prism element 210a.

Figure 9:
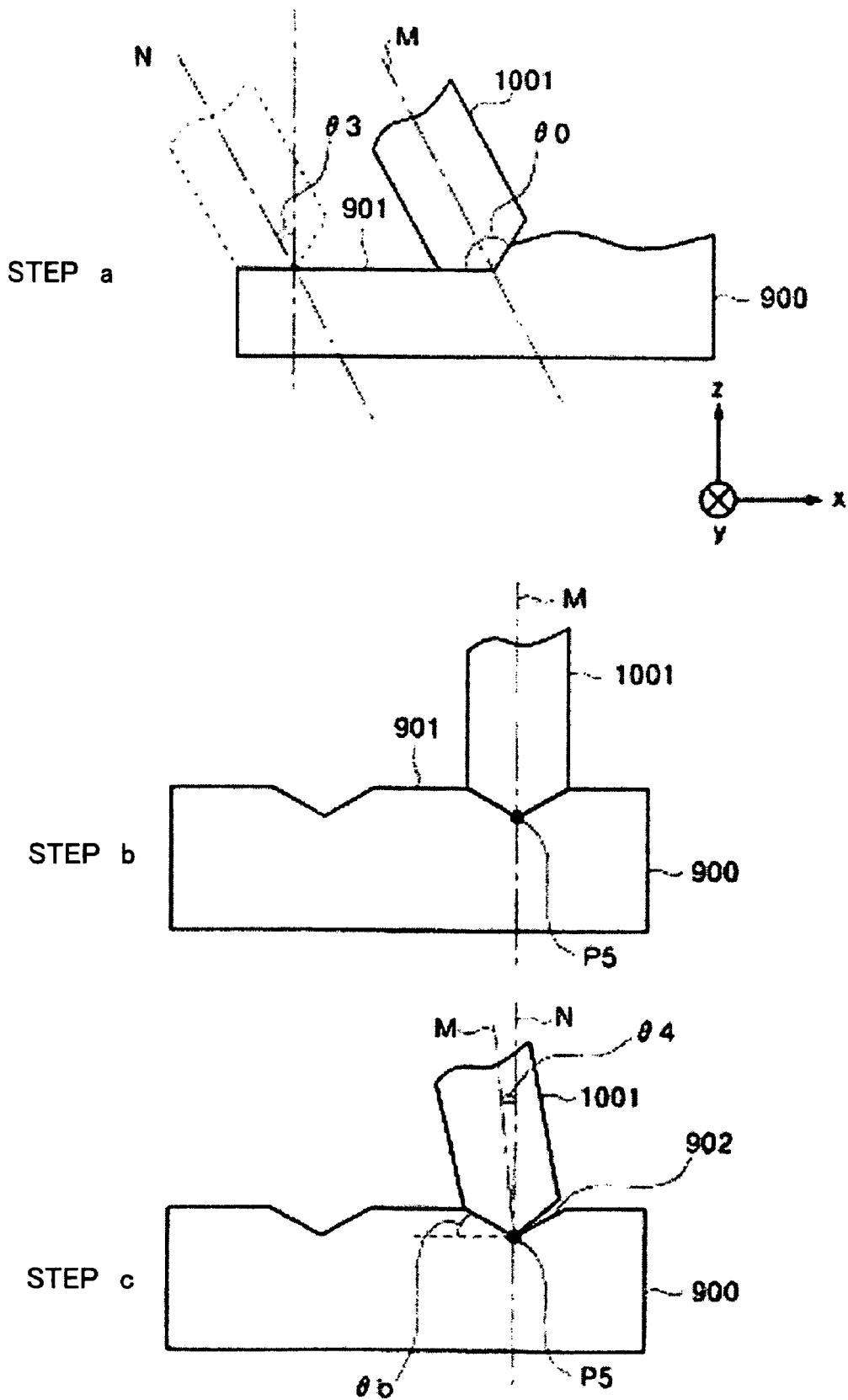
FIG. 9 is an exemplary diagram for explaining machining in the third embodiment of the invention.

FIG. 9 shows a manufacturing procedure for the prism element 905. In the manufacturing method for a fine structure element in this embodiment, a V-shaped cutting tool 1001 is used. The cutting tool 1001 has two cutting sections as in the cutting tool 501 shown in FIG. 3B. In this exemplary embodiment, as in the second embodiment, a trial machining process is performed as a preprocess of a process for forming a prism element. In the trial machining process, a predetermined shape is formed by the cutting tool 1001 serving as a cutting portion on the basis of machining data in a trial machining region different from the flat portion 901.

Following the trial machining process, the real machining for the prism element 905 is performed. The prism element 905 is formed by performing the flat portion forming step and the refracted surface forming step on the basis of the machining data corrected in the feedback step. In the flat portion forming step indicated by step "a" in FIG. 9, a flat surface 901 is cut in a substrate 900 by a cutting tool 1001 serving as a cutting section. One of two cutting sections of the cutting tool 1001 is used for cutting the substrate 900 to form the flat surface 901. The flat surface 901 is formed by cutting the substrate 900 in a state in which the cutting tool 1001 is inclined such that one cutting section becomes substantially horizontal. The cutting tool 1001 is attached to a not-shown cutting machine such that a central axis M of the cutting tool 1001 is inclined at an angle θ3 with respect to a perpendicular N of the substrate 900. The cutting tool 1001 is attached to a machine body via, for example, a not-shown shank. Correction of the machining data in the trial machining process is fed back together with, for example, an attachment error between the machine body and the shank, an attachment error between the shank and the cutting tool 1001, and a reference error set in the cutting machine. Both a position of the cutting tool 1001 in a z-axis direction and the angle θ3 are determined by feedback.

The cutting tool 1001 rotates around the central axis M to cut the surface of the substrate 900. The cutting tool 1001 moves in a y-axis direction while cutting the surface of the substrate 900. When the movement in the y-axis direction is completed, the cutting tool 1001 is moved to a position shifted in a positive x direction to start cutting in the y-axis direction again. The flat surface 901 is formed by repeating such cutting.

Steps "b" and "c" shown in FIG. 9 indicate the refractive surface forming step. In the refractive surface forming step, the cutting tool 1001 is shifted to a position where the central axis M substantially coincides with the perpendicular N. At this point, the cutting tool 1001 is never removed from the cutting machine but is shifted by operating, for example, the shank. Here, it is assumed that the cutting tool 1001 having a tip with an angle θ0, which is designed to suit a groove to be formed in the substrate 900, is used. First, in step "b", the substrate 900 is cut in a state in which the central axis M substantially coincides with the perpendicular N.

When an angle according to the corrected machining data is larger than the angle θ0 in design, as indicated by step "c", the cutting tool 1001 is inclined by an angle θ4, which is a correction value, around a tip P5 of a groove on the substrate 900. In this case, both the angle θ4 formed by the central axis M of the cutting tool 1001 with respect to the perpendicular N and a direction in which the cutting tool 1001 is inclined are determined on the basis of the corrected machining data. In this way, a refractive surface 902 having a predetermined angle θb with respect to the flat surface 901 is formed by the cutting tool 1001 serving as the cutting section. Note that step "c" in FIG. 9 indicates a state in which the cutting tool 1001 is inclined only in a negative x direction with the perpendicular N as a reference. However, the cutting tool 1001 may be inclined in plural directions on the basis of the corrected machining data. The prism element 901 is manufactured in this way.

Figure 10:
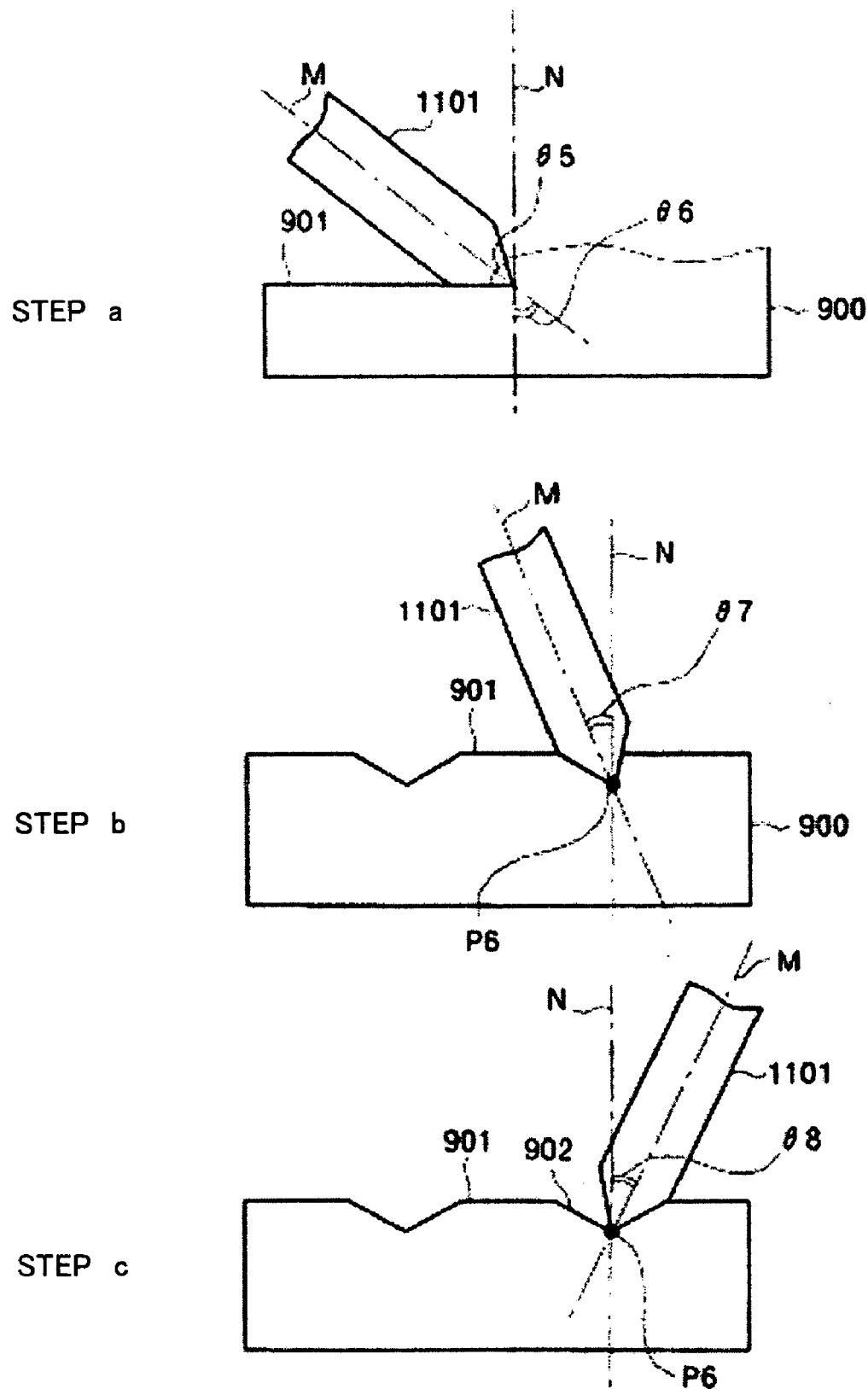
FIG. 10 is an exemplary diagram for explaining the machining in the third embodiment.

FIG. 10 shows a manufacturing procedure in the case in which a cutting tool 1101 having a tip with an angle θ5 smaller than a groove to be formed in the substrate 900 is used. In a flat surface forming step indicated by step "a" in FIG. 10, as in step "a" in FIG. 9, the flat surface 901 is formed using one of two cutting sections of the cutting tool 1101. The cutting tool 1101 is attached to a not-shown cutting machine such that a central axis M of the cutting tool 1101 is inclined at an angle θ5 with respect to the perpendicular N of the substrate 900.

Next, the slope 902 serving as a refractive surface having the predetermined angle θb with respect to the flat surface 901 is formed by the cutting tool 1101 serving as the cutting section according to a refractive surface forming step indicated by steps "b" and "c" in FIG. 10. The slope 902 can be formed by inclining the butting tool 1101 centering around a tip P6 of a groove after shifting the cutting tool 1101 to a position, where the central axis M of the cutting tool 1101 and the perpendicular N substantially coincide with each other, to cut the substrate 900. In step "b", the cutting tool 1101 is shifted to a position where the central axis M of the cutting tool 1101 and the perpendicular N form an angle θ7. In step "c", the cutting tool 1101 is shifted to a position where the central axis M of the cutting tool 1101 and the perpendicular N forms an angle θ8. The angles θ7 and θ8 are determined on the basis of the corrected machining data, respectively.

In this way, the flat surface 901 and the slope 902 are formed using the identical cutting tool 1101. Consequently, it is possible to form the refractive section with the very small inclination angle θb controlled highly accurately without depending on a shape of the cutting tool 1101. In addition, the flat surface 901 formed first is a reference plane for the refractive surface forming step. Therefore, even if there is a wavy shape or a fine uneven shape on the surface of the substrate 900, it is possible to perform cutting without being affected by the wavy shape or the uneven shape.

Figure 11:
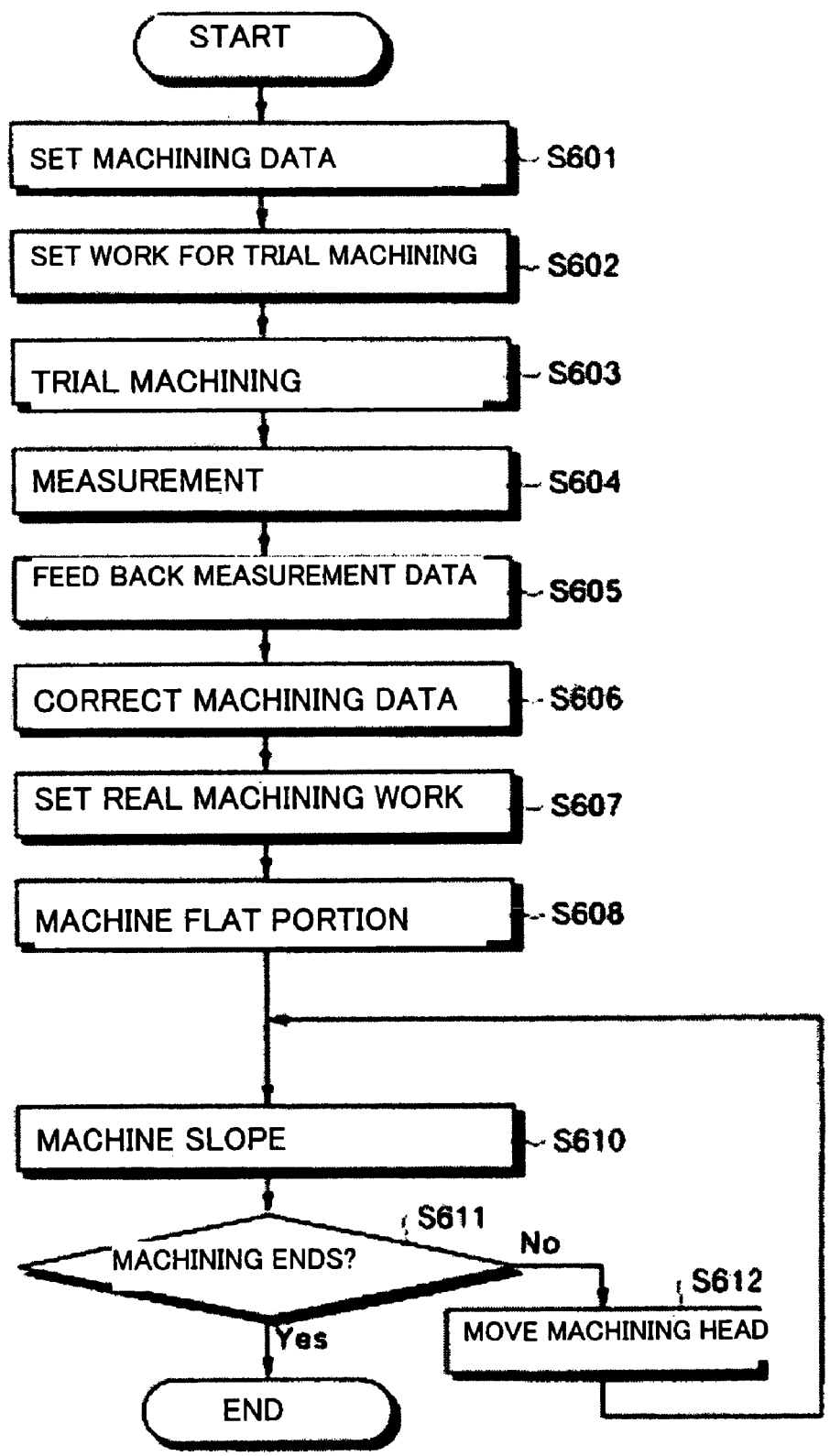
FIG. 11 is an exemplary diagram for explaining a manufacturing procedure in the third embodiment.

FIG. 11 is a flowchart of a manufacturing procedure for the prism element 905 in this embodiment. In the manufacturing procedure for the prism element 905, steps S601 to S607 are the same as the manufacturing procedure for the prism element 210a in the second embodiment. In the manufacturing procedure for the prism element 905 in this embodiment, in step S608, the flat surface 901 is cut in a state in which the cutting tool 1101 is inclined to such that the central axis M of the cutting tool 1101 forms a predetermined angle with respect to the perpendicular N of the substrate 900.

Next, in step S610, the substrate 900 is cut in a state in which the cutting tool 1101 is shifted to a position where the central axis M of the cutting tool 1101 substantially coincides with the perpendicular N. In step S610, the slope 902 is formed by inclining the cutting tool 1101 such that the central axis M of the cutting tool 1101 forms a predetermined angle in a predetermine direction with respect to the perpendicular N. In addition, in steps S611 and S612, a procedure for judging end of machining and moving the machining head is the same as that in the manufacturing method for the prism element 210a in the second embodiment. Consequently, it is possible to perform shape machining with influence such as disturbance reduced. In addition, in this embodiment, again, the same substrate may be used for the substrate for trial machining and the substrate for real machining.

Figure 12:
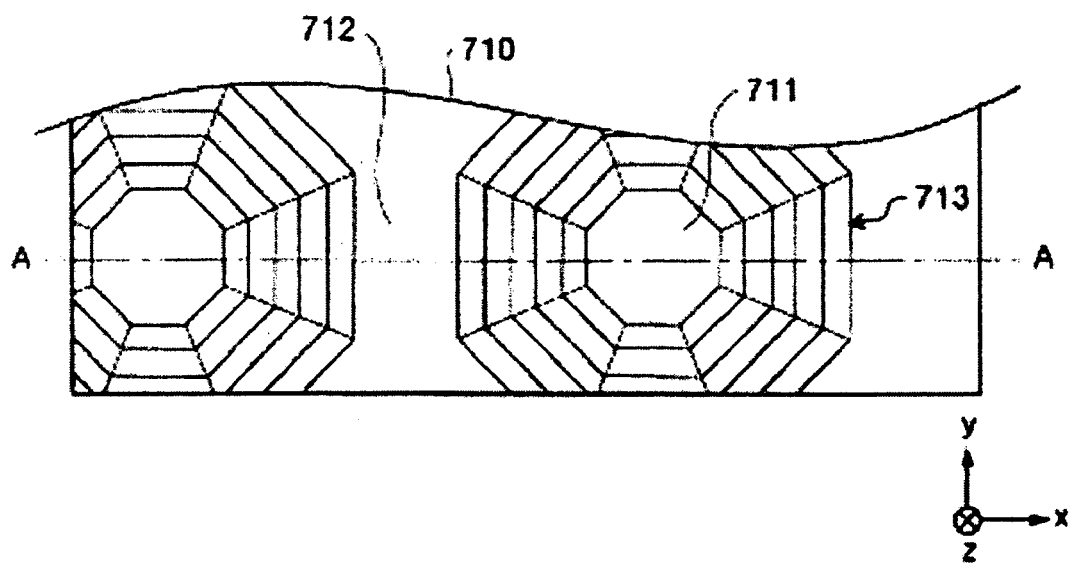
FIG. 12 an exemplary diagram for explaining real machining in a fourth embodiment of the invention.

A manufacturing method for a fine structure element according to a fourth exemplary embodiment of the invention will be explained with reference to FIGS. 12 to 15. In this embodiment, a grayscale mask 710, which has a region where transmissivity of light in a predetermined region varies stepwise, is used. FIG. 12 is a diagram of the grayscale mask 710 viewed from a z-axis direction along an optical axis. First, a region 711 with transmissivity of 0%, where no light is transmitted, and a region 712 with transmissivity of substantially 100%, where all incident lights are transmitted, are formed. A region 713 where transmissivity varies stepwise is formed between the region 711 and the region 712. FIG. 12 shows an example in which transmissivity changes in five steps in the region 713.

Figure 13:
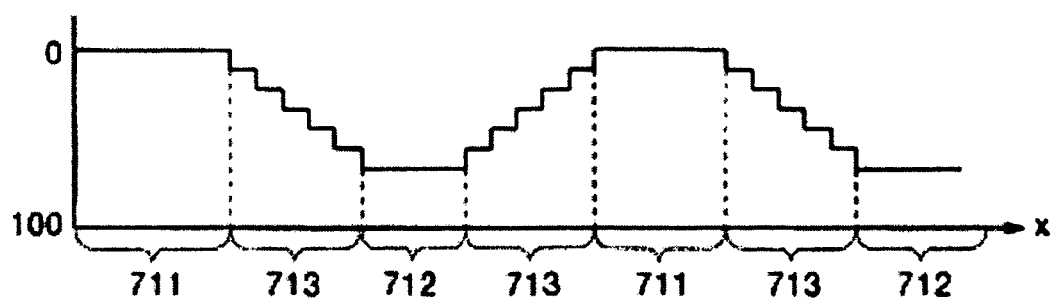
FIG. 13 is another exemplary diagram for explaining the real machining in the fourth embodiment.
Figure 14:
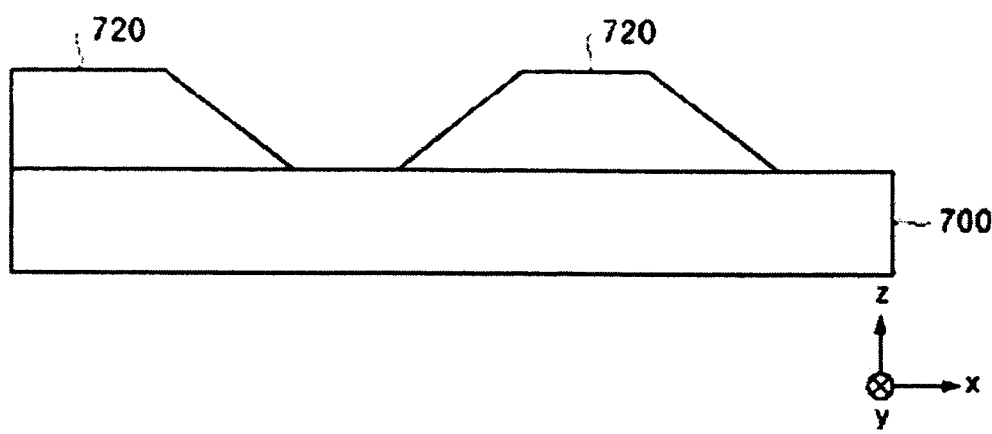
FIG. 14 is still another exemplary diagram for explaining the parent machining in the fourth embodiment 4.

FIG. 13 shows a change in transmissivity of a section AA in FIG. 12. A horizontal axis and a vertical axis in FIG. 13 indicate a position x and transmissivity I (%), respectively. The region 711 with the transmissivity of 0% corresponds to an upper flat surface and the region 712 with the transmissivity of 100% corresponds to a lower flat surface. The region 713, where the transmissivity change, corresponds to a slope.

First, in a resist layer forming step, a resist layer 720 is formed on a substrate 700. In an exposure step shown in FIG. 14, the resist layer 720 is exposed to light via the grayscale mask 710 in which transmissivity of light changes stepwise. Then, in the lithography step, a shape corresponding to the transmissivity of the grayscale mask 710 is transferred to the resist layer 720. Here, the transmissivity is changed stepwise in a step smaller than a resolution of the resist layer 720, whereby it is possible to obtain a slope with a surface shape smoothed. As another method of smoothing a slope of the resist layer 720, the resist layer 720 after the lithography step may be post-baked at, for example, about 120° C. Roll over is caused by the post-bake on the surface of the resist layer 720. The surface of the slope is smoothed by the roll over. In addition, it is possible to control a size of the step of the transmissivity on the basis of a type of a resist, pre-bake time, exposure time, development time, and the like.

In this exemplary embodiment, AZ4620 (product name) of Clariant is used as the resist layer 720. Treatment is applied to the resist layer 720 under parameter conditions described below.

Pre-bake: 90° C., thirty minutes
Exposure: 800 mj
Development: Seven minutes
Post-bake: 120° C., sixty minutes Consequently, it is possible to manufacture a desired prism shape. Here, relationship between the respective parameter conditions and a shape to be formed will be explained. As the pre-bake condition, sensitivity of the resist increases when temperature is lowered. However, when temperature is lowered, since resistance properties in an unexposed region at the time of development falls, it is difficult to secure thickness. Concerning the exposure time, gradation is obtained according to transmissivity (OD value) in the grayscale mask method. When the exposure time is extended, influence of leaked light from a light shielding region increases to make it disadvantageous to form a step region. When the development time is extended, resistance properties of the unexposed area at the time of development fall. As a result, it becomes difficult to secure film thickness. In the post-bake, as described above, it is possible to intentionally cause roll over of an edge that occurs in a step portion of transmissivity. When the post-bake is not performed, a selection ratio at the time of dry etching falls. In addition, when the post-bake is not performed properly, burnt deposit due to plasma at the time of dry etching occurs to make it difficult to transfer a shape.

Figure 15:
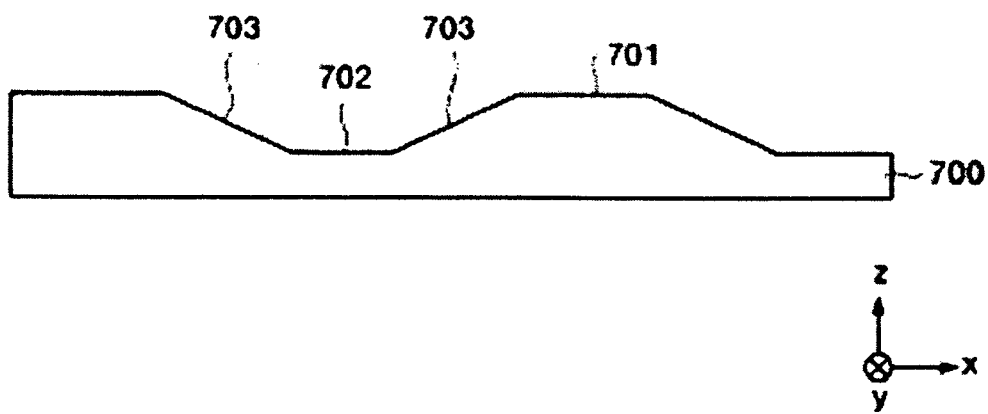
FIG. 15 is still another exemplary diagram for explaining the parent machining in the fourth embodiment.

Then, in an etching step shown in FIG. 15, the shape of the resist layer 720 is transferred to the substrate 700. As the etching step, for example, a dry etching step according to a RIE method or the like is performed. As an etching gas, a mixed gas of oxygen and fluoride gas, for example, $C_4F_8$ or $CF_4$ is used. Consequently, it is possible to reduce an uneven shape of a machined surface due to etching spots and manufacture a smooth and satisfactory prism element. It is possible to control a selection ratio for transferring a resist shape to the substrate 700 in a range of about 0.7 to 1.8 times by controlling etching conditions, such as an etching gas concentration, a mixing ratio, an etching gas pressure, a magnetic field intensity, and etching time. Unevenness of about several tens to several hundreds nm, which causes unnecessary scattered light, may occur on a surface of a prism element formed by dry etching. In this embodiment, a wet etching process using fluoric acid solution is performed after the dry etching step. Consequently, it is possible to smooth the uneven shape on the machined surface and reduce unnecessary scattered light. On the substrate 700, plural prism elements are formed on a large glass substrate. Then, finally, a substrate of a desired size is obtained by dicing. As a result, it is possible to form the upper flat surface 701, the lower flat surface 702, and the slope 703 of desired shapes.

In this embodiment, it is also possible to manufacture a prism element with pattern transfer. In the pattern transfer, first, a desired shape is formed in the resist layer 720. Thereafter, Ni plating is applied to the resist layer 720 to manufacture a die. Then, a replica is formed using this die. Consequently, it is possible to manufacture a large quantity of replicas easily. As mentioned above, the manufacturing method in this embodiment is suitable as a manufacturing method for a dioptric element having a slope different from the micro-lens. Note that the pattern transfer is not always performed on the basis of a shape formed on the resist layer 720 but may be performed on the basis of a shape formed on a substrate by the manufacturing methods in the respective embodiments.

When a shape of a prism element formed on the insulating resist layer 720 or substrate 700 is used as a mother die, first, a conductive film is formed by, for example, vacuum evaporation of Si, Ni, Al, or the like, silver mirror reaction, or electroless Ni plating in the shape of the prism element. After giving electrical conductivity to the prism element by forming the conductive film, electric field plating with Ni or the like is applied to the shape of the prism element. In this case, if an internal stress is generated in the plated film, distortion occurs in the manufactured die to deteriorate reproducibility of the shape of the prism element. When a region of two inches is transferred by, for example, electrocasting, in order to ease the stress generated in the plated film, it is preferable to apply plating to a region of five inches or more, desirably, six inches or more that is larger than a desired die. Then, it is possible to obtain a die of a desired shape by cutting out a necessary portion of a formed object obtained by the plating. In this way, it is possible to reduce the internal stress by applying plating to a region larger than the region required for the pattern transfer to manufacture a die of an accurate shape. The electrocasting has a characteristic that unevenness in a submicron order can be transferred faithfully. Consequently, it is possible to transfer a fine shape of a prism element accurately to manufacture a replica of an accurate shape.

The prism element may be manufactured by forming plural dies using a shape formed in the substrate 700 or the resist layer 720 as a mother die and transferring a pattern to other members using the formed plural dies. For example, plural dies are formed from a single mother die by the plating. Then, a replica is manufactured using the plural dies. When a single large die is formed, it is necessary to manufacture a large mother die. For example, when a large mother die is manufactured according to the manufacturing method for a fine structure element according to the second embodiment, long time is required and cost increases. For example, when a replica is manufactured using six dies on one surface of the substrate 700, a mother die of a size one sixth as large as a desired prism group only has to be prepared. In this way, even if it is difficult to form a single large die, it is possible to manufacture a replica easily by using plural dies. In addition, a replica is manufactured using plural dies manufactured from an identical mother die, whereby it is possible to obtain a prism group that has an accurate shape and is capable of obtaining a uniform and high definition image. Note that, in the example explained in this exemplary embodiment, a die is formed using the resist layer 720 formed in a predetermined shape as a mother die. However, it should be understood that a base material is not limited to a resist and other members, such as a dies, to which nickel phosphorous plating is applied, a resin prism, a glass prism, and the like may be used.

As described above, when plural dies are manufactured from a fine structure element formed by machining or photolithography, a die is copied by plating for a region 2.5 time or more, preferably, three times or more as large as a region where a desired structure is formed and a necessary region is cut out from the copied die. By using the die obtained in this way, it is possible to manufacture a highly accurate fine structure element at low cost and in a large quantity.

In addition, a prism group including two orthogonal prism elements like, for example, the prism group 210 shown in FIG. 2, may be manufactured by transferring shapes of dies to two surfaces of the single substrate 700, respectively. In a prism group including two sets of orthogonal prism elements, a pattern is transferred to a first surface of the substrate 700, which is a separate member, using a first die and a pattern is transferred to a second surface on the opposite side of the first surface using a second die. Since the pattern is transferred to the first surface and the second surface using the first die and the second die, respectively, it is possible to form a prism group having prism elements on the first surface and the second surface easily. In addition, since the first die and the second die are manufactured using an identical mother die, it is possible to obtain a prism group that has an accurate shape and is capable of obtaining a uniform and high definition image.

Figure 16A:
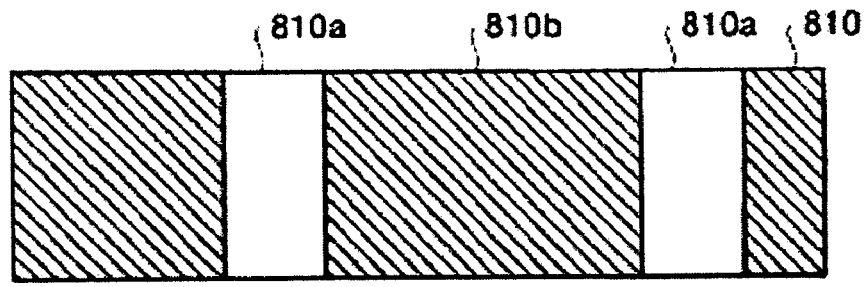
FIG. 16A is an exemplary schematic diagram of a first mask in a fifth embodiment of the invention.
Figure 16B:
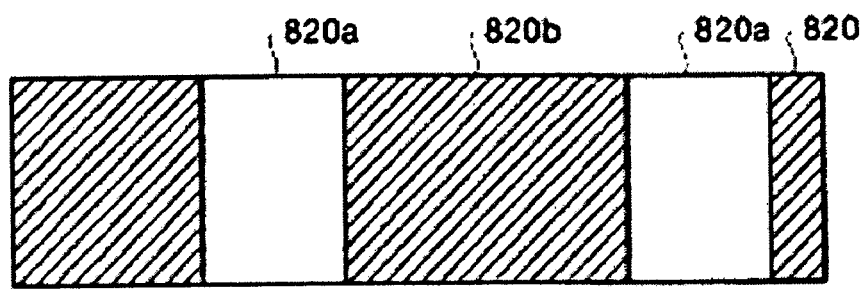
FIG. 16B is an exemplary schematic diagram of a second mask in the fifth embodiment.
Figure 16C:
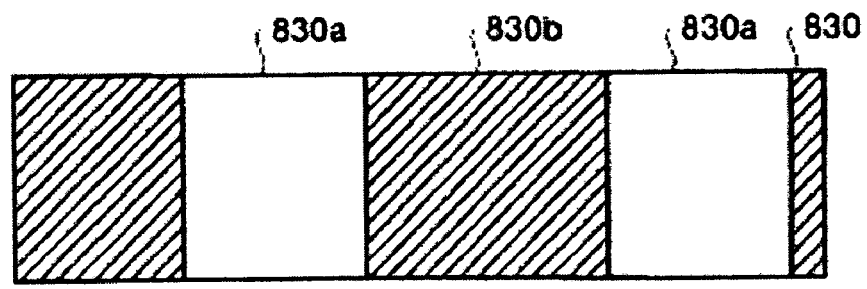
FIG. 16C is an exemplary schematic diagram of a third mask in the fifth embodiment.

A manufacturing method for a fine structure element according to a fifth exemplary embodiment of the invention will be explained with reference to FIGS. 16A to 16D and FIG. 17. In this exemplary embodiment, plural light shielding masks with different areas of openings. FIG. 16A shows a structure of a first mask 810. The first mask 810 has plural openings 810a of a first size. Regions 810b indicated by shading are light shielding regions. FIG. 16B shows a structure of a second mask 820. The second mask 820 has plural openings 820a of a second size. Regions 820b indicated by shading are light shielding regions. FIG. 16C shows a structure of a third mask 830. The third mask 830 has plural openings 830a of a third size. Regions 830b indicated by shading are light shielding regions.

Figure 16D:
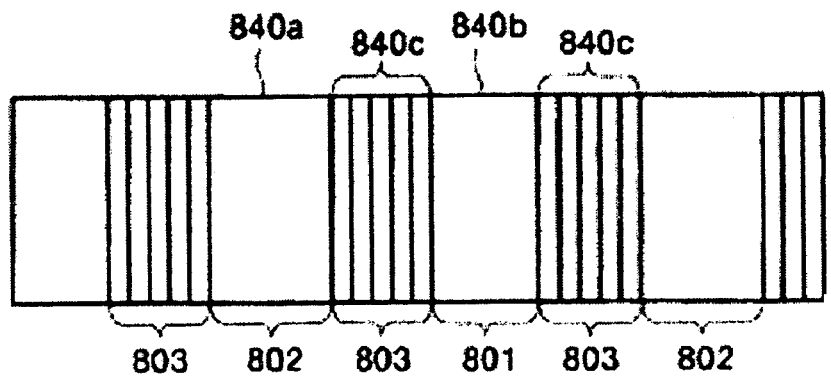
FIG. 16D is an exemplary diagram for explaining multiple-exposure in the fifth embodiment.
Figure 17:
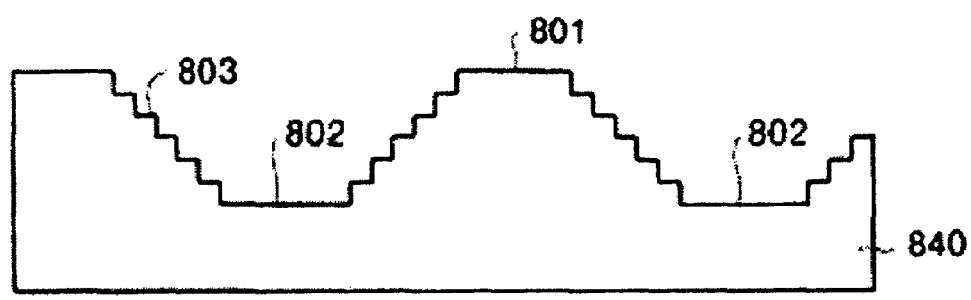
FIG. 17 is an exemplary diagram for explaining a resist layer in the fifth embodiment.

Here, the sizes of the respective openings are set such that the openings of the second size are larger than the openings of the first size and the openings of the third size is larger than the openings of the second size. Multiple exposure is performed three times using these three masks 810, 820, and 830. As a result, in a resist layer, there are a region where an amount of exposure is uniform and a region where an amount of exposure changes stepwise in three steps. FIG. 16D shows regions with different transmissivities at the time when multiple exposure in five steps is performed using two same masks in addition to the three masks. For example, a region 840a exposed in all the five masks has a largest amount of exposure. Therefore, a resist layer 840 in this region 840a reacts with a developer most. As a result, the resist layer is removed most in the region 840a and a flat surface 802 shown in FIG. 17 is formed.

On the contrary, in a resist layer of a region 840b that is shielded in all five times of exposure, an amount of exposure is zero. Therefore, the resist layer 840 in this region 840b is not removed in a developing step and a flat surface 801 shown in FIG. 17 is formed. In a region 840c between the two flat surfaces 801 and 802, an amount of exposure changes stepwise. Therefore, a slope 803 having a step-like resist thickness is formed in this region 840c.

Figure 18:
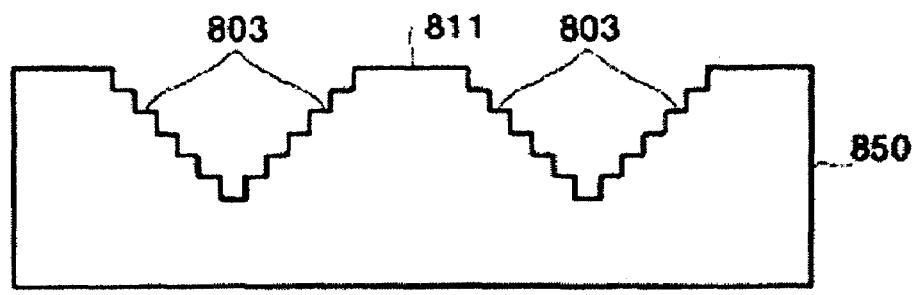
FIG. 18 is another exemplary diagram for explaining a resist layer in the fifth embodiment.

Thereafter, the resist layer 840 is heated to, for example, 100° C. and baked using an oven. Consequently, moisture and solvent are volatilized in the resist layer 840 to improve dry etching resistance. Moreover, since roll over is generated by heating in the resist layer 840, it is possible to change a step-shaped portion to a smoothed slope. When the resist layer 840 is formed on a not-shown glass substrate, it is possible to form a shape of the resist layer 840 on a glass substrate by dry etching. In this case, it is desirable to smooth a surface of the resist layer 840 by etching the resist layer 840 with fluoric acid solution after transferring the shape to the glass substrate. Consequently, it is possible to obtain a prism element of the same shape as the prism element 210a shown in FIG. 3A. It is also possible to form a resist layer 850 including a flat portion 811 and slopes 803 as shown in FIG. 18 according to the manufacturing method for a fine structure element in this embodiment. Consequently, it is possible to obtain a prism element of the same shape as the prism element 905 shown in FIG. 8.

As in the exemplary embodiments described above, it is also possible to form a die by applying Ni plating to the resist layer 840 in which a predetermined shape is formed. It is possible to manufacture a replica from the die easily. In this embodiment, it is possible to control an angle formed by a flat portion and a slope serving as a refractive surface easily according to sizes of the openings 810a, 820a, and 830a of the masks. As a result, it is possible to manufacture a fine structure element in which an angle formed by a flat portion and a refractive surface is very small. Like the manufacturing method in the fourth embodiment, the manufacturing method in this embodiment is suitable as a manufacturing method for a dioptric element having a slope with a very small angle different from the micro-lens.

Figure 19:
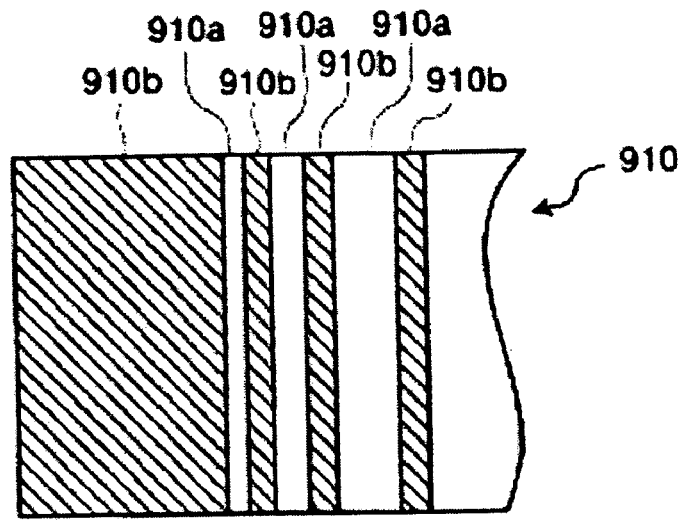
FIG. 19 is an exemplary schematic diagram of a mask in a sixth embodiment of the invention.

A manufacturing method for a fine structure element according to a sixth exemplary embodiment of the invention will be explained with reference to FIG. 19. FIG. 19 shows a structure of a mask 910. Since steps from a step after the exposure step to a step of obtaining a fine structure element finally are the same as those in the embodiments describe above, repetitious explanations of the steps are omitted. In the exposure step in this embodiment, a resist layer is exposed to light using the mask 910 in which areas of strip-like openings 910a vary depending on a position. In FIG. 19, areas of the openings 910a increase and areas of light shielding section 910b decrease from the left to the right on the figure. As a result, a flat surface is formed in a region where an amount of exposure is uniform. A slope serving as a refractive surface is formed in a region where an amount of exposure changes stepwise.

Figure 20:
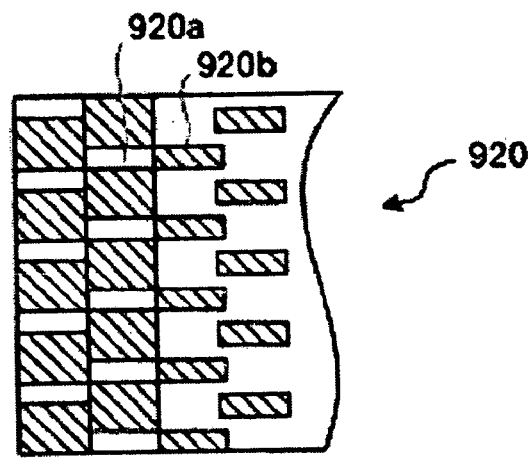
FIG. 20 is an exemplary schematic diagram of a mask in a modification of the sixth embodiment.

A modification of this embodiment will be explained with reference to FIG. 20. FIG. 20 shows a structure of a mask 920. Since steps from a step after the exposure step to a step of obtaining a fine structure element finally are the same as those in the embodiments describe above, repetitious explanations of the steps are omitted. In an exposure step in this modification, a resist layer is exposed to light using the mask 920 in which areas of rectangular openings 920a and rectangular light shielding sections 920b are different depending on a position. The openings 920a and the light shielding sections 920b are alternately arranged two-dimensionally. In FIG. 20, areas of the openings 920a increase and areas of the light shielding sections 920b decrease from the left to the right on the figure. As a result, a flat surface is formed in a region where an amount of exposure is uniform. A slope serving as a refractive surface is formed in a region where an amount of exposure changes stepwise. It is also possible to form circular light shielding sections 930b as in a mask 930 shown in FIG. 21. In this case, a region between the light shielding sections 930b is an opening 930a. Consequently, it is possible to control an angle formed by a flat portion and a refractive surface easily according to sizes and positions of opening of a mask. As a result, it is possible to manufacture a fine structure element in which an angle formed by a flat portion and a refractive surface is very small.

Figure 21:
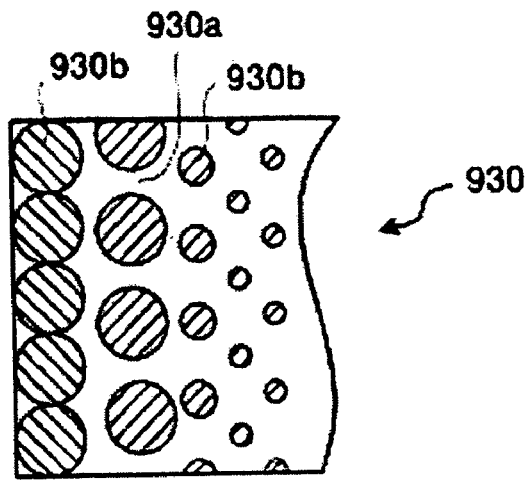
FIG. 21 is an exemplary schematic diagram of a mask in another modification of the sixth embodiment.

Like the manufacturing method in the fourth embodiment, the manufacturing method in this embodiment is also suitable as a manufacturing method for a dioptric element having a slope different from the micro-lens. Note that, when the masks of the structures shown in FIGS. 19, 20, and 21 are used, it is desirable to apply exposure to a resist layer according to a so-called projection method. In the projection method, it is possible to form a gentle slope in a resist layer using means for blurring a projected image.

In order to form a shape of a fine structure element in a resist layer, it is also possible to use an electron beam rendering exposure method and a laser rendering exposure method other than the grayscale mask method. In this way, the invention is not limited to the exemplary embodiments described above and it is possible to adopt various modifications in a range not departing from the spirit and scope of the invention.

The invention claimed is:

1. A manufacturing method for a fine structure element, comprising:
    forming a flat portion on a substrate with a cutting section;
    forming a refractive surface having a predetermined angle with respect to the flat portion;
    forming the flat portion including:
        forming a first flat portion on the substrate with the cutting section,
        cutting the first flat portion by a predetermined depth to form a second flat portion, and
        forming a refractive surface with the cutting section, the refractive surface having a predetermined angle with respect to the second flat portion;
    forming a predetermined shape with the cutting section on a basis of machining data in a trial machining region different from the first flat portion;
    measuring the predetermined shape formed in the trial machining step;
    feeding back a difference between the measured predetermined shape and the machining data to correct the machining data; and
    forming the first flat portion, the second flat portion, and the refractive surface being performed on a basis of the corrected machining data.

2. The manufacturing method for a fine structure element according to claim 1,
    the cutting section having at least a first cutting section and a second cutting section;
    wherein the first cutting section is used to form at least two of the first flat portion, the second flat portion, and the refractive surface.

3. The manufacturing method for a fine structure element according to claim 1, a length of the first flat portion being smaller than a length of the second flat portion in a predetermined section.

* * * * *